US012663817B2

(12) United States Patent
Nie et al.

(10) Patent No.: US 12,663,817 B2
(45) Date of Patent: Jun. 23, 2026

(54) PREDICTIVE PATH COORDINATION IN MULTI-ROBOT SYSTEMS

(71) Applicant: University of South Florida, Tampa, FL (US)

(72) Inventors: Zixiang Nie, Tampa, FL (US); Kwang-Cheng Chen, Tampa, FL (US)

(73) Assignee: University of South Florida, Tampa, FL (US)

( * ) Notice: Subject to any disclaimer, the term of this patent is extended or adjusted under 35 U.S.C. 154(b) by 138 days.

(21) Appl. No.: 18/615,252

(22) Filed: Mar. 25, 2024

(65) Prior Publication Data

US 2024/0319750 A1     Sep. 26, 2024

Related U.S. Application Data

(60) Provisional application No. 63/491,746, filed on Mar. 23, 2023.

(51) Int. Cl.
| | |
|---|---|
| *G05D 1/698* | (2024.01) |
| *G05D 1/644* | (2024.01) |
| *G05D 1/667* | (2024.01) |
| *G05D 101/15* | (2024.01) |
| *G05D 107/70* | (2024.01) |

(52) U.S. Cl.
CPC ........... *G05D 1/6983* (2024.01); *G05D 1/644* (2024.01); *G05D 1/667* (2024.01); *G05D 2101/15* (2024.01); *G05D 2107/70* (2024.01)

(58) Field of Classification Search
CPC ...... G05D 1/6983; G05D 1/644; G05D 1/667; G05D 1/693; G05D 1/6987; G05D 2101/15; G05D 2107/70; G05D 2105/28; G05D 2109/10; G05B 2219/50391; G05B 19/41895
See application file for complete search history.

(56) References Cited

U.S. PATENT DOCUMENTS

| | | | |
|---|---|---|---|
| 2021/0229281 A1* | 7/2021 | Natarajan ................ | B25J 9/163 |
| 2024/0408762 A1* | 12/2024 | Landernäs ......... | G05B 19/4189 |

FOREIGN PATENT DOCUMENTS

| | | | | |
|---|---|---|---|---|
| CN | 111539574 A | * | 8/2020 | ........... G06Q 10/047 |
| GB | 2225132 A | * | 5/1990 | ........... B25J 9/1676 |

OTHER PUBLICATIONS

Desaraju et al.; Decentralized path planning for multi-agent teams with complex constraints; Auton Robot (2012) 32:385-403 DOI 10.1007/s10514-012-9275-2; Feb. 2, 2012 (Year: 2012).*

(Continued)

*Primary Examiner* — Aniss Chad
(74) *Attorney, Agent, or Firm* — Meunier Carlin & Curfman LLC

(57) ABSTRACT

A system and methods for operating a multi-robot system (MRS) are disclosed. An example method can include receiving at least one transportation task; determining an optimal path for executing the at least one transportation task based at least in part on: (i) one or more transportation task parameters, (ii) a shared global critic function accessible to the first robot and the at least one additional robot, and (iii) a local critic function unique to the first robot; and executing the at least one transportation task in accordance with the determined optimal path.

20 Claims, 13 Drawing Sheets

(56)                    References Cited

OTHER PUBLICATIONS

K. C. Chen, S. C. Lin, J. H. Hsiao, C. H. Liu, A. F. Molisch, and G. P. Fettweis, "Wireless networked multirobot systems in smart factories," Proceedings of the IEEE, vol. 109, No. 4, pp. 468-494, 2021.

Y. Chen, F. Zhao, and Y. Lou, "Interactive model predictive control for robot navigation in dense crowds," IEEE Transactions on Systems, Man, and Cybernetics: Systems, vol. 52, No. 4, pp. 2289-2301, 2022.

Y. Liu, B. Zhou, X. Wang, L. Li, S. Cheng, Z. Chen, G. Li, and L. Zhang, "Dynamic lane-changing trajectory planning for autonomous vehicles based on discrete global trajectory," IEEE Transactions on Intelligent Transportation Systems, vol. 23, No. 7, pp. 8513-8527, 2022.

Z. Nie and K.-C. Chen, "Hypergraphical real-time multirobot task allocation in a smart factory," IEEE Transactions on Industrial Informatics, vol. 18, No. 9, pp. 6047-6056, 2022.

S. K. Jagatheesaperumal, M. Rahouti, K. Ahmad, A. Al-Fuqaha, and M. Guizani, "The duo of artificial intelligence and big data for industry 4.0: Applications, techniques, challenges, and future research directions," IEEE Internet of Things Journal, vol. 9, No. 15, pp. 12 861-12 885, 2022.

A. Balachandran, A. Lal S, and P. Sreedharan, "Autonomous navigation of an amr using deep reinforcement learning in a warehouse environment," in 2022 IEEE 2nd Mysore Sub Section International Conference (MysuruCon). IEEE, 2022, pp. 1-5.

S. S. Abosuliman and A. O. Almagrabi, "Routing and scheduling of intelligent autonomous vehicles in industrial logistics systems," Soft Computing, vol. 25, pp. 11 975-11 988, 2021.

W. Xia, J. Goh, C. A. Cortes, Y. Lu, and X. Xu, "Decentralized coordination of autonomous agvs for flexible factory automation in the context of industry 4.0," in 2020 IEEE 16th International Conference on Automation Science and Engineering (CASE). IEEE, 2020, pp. 488-493.

Z. Liu, Y. Zhang, C. Yuan, and J. Luo, "Adaptive path following control of unmanned surface vehicles considering environmental disturbances and system constraints," IEEE Transactions on Systems, Man, and Cybernetics: Systems, vol. 51, No. 1, pp. 339-353, 2021.

J. Zhao, W. Li, C. Hu, G. Guo, Z. Xie, and P. K. Wong, "Robust gain-scheduling path following control of autonomous vehicles considering stochastic network-induced delay," IEEE Transactions on Intelligent Transportation Systems, vol. 23, No. 12, pp. 23 324-23 333, 2022.

M. Pei, H. An, B. Liu, and C. Wang, "An improved dyna-q algorithm for mobile robot path planning in unknown dynamic environment," IEEE Transactions on Systems, Man, and Cybernetics: Systems, vol. 52, No. 7, pp. 4415-4425, 2022.

K. V. Sagar and J. Jerald, "Real-time automated guided vehicles scheduling with markov decision process and double q-learning algorithm," Materials Today: Proceedings, vol. 64, pp. 279-284, 2022.

Z. Chen, J. Alonso-Mora, X. Bai, D. D. Harabor, and P. J. Stuckey, "Integrated task assignment and path planning for capacitated multi-agent pickup and delivery," IEEE Robotics and Automation Letters, vol. 6, No. 3, pp. 5816-5823, 2021.

T. Yamauchi, Y. Miyashita, and T. Sugawara, "Standby-based deadlock avoidance method for multi-agent pickup and delivery tasks," in Proceedings of the 21st International Conference on Autonomous Agents and Multi-agent Systems, ser. AAMAS '22. Richland, SC: International Foundation for Autonomous Agents and Multi-agent Systems, 2022, pp. 1427-1435.

M. Kneissl, A. K. Madhusudhanan, A. Molin, H. Esen, and S. Hirche, "A multi-vehicle control framework with application to automated valet parking," IEEE Transactions on Intelligent Transportation Systems, vol. 22, No. 9, pp. 5697-5707, 2021.

M. Autili, L. Chen, C. Englund, C. Pompilio, and M. Tivoli, "Cooperative intelligent transport systems: Choreography-based urban traffic coordination," IEEE Transactions on Intelligent Transportation Systems, vol. 22, No. 4, pp. 2088-2099, 2021.

I. Ahmed, G. Jeon, and F. Piccialli, "From artificial intelligence to explainable artificial intelligence in industry 4.0: A survey on what, how, and where," IEEE Transactions on Industrial Informatics, vol. 18, No. 8, pp. 5031-5042, 2022.

H. Ghorbel, J. Dreyer, F. Abdalla, V. R. Montequin, Z. Balogh, E. Gatial, I. Bundinska, A. Gligor, L. B. Iantovics, and S. Carrino, "Soon: Social network of machines to optimize task scheduling in smart manufacturing," in 2021 IEEE 32nd Annual International Symposium on Personal, Indoor and Mobile Radio Communications (PIMRC). IEEE, 2021, pp. 1-6.

H. Shi, J. Li, M. Liang, M. Hwang, K.-S. Hwang, and Y.-Y. Hsu, "Path planning of randomly scattering waypoints for wafer probing based on deep attention mechanism," IEEE Transactions on Systems, Man, and Cybernetics: Systems, vol. 53, No. 1, pp. 529-541, 2023.

R. Reijnen, Y. Zhang, W. Nuijten, C. Senaras, and M. Goldak Altgassen, "Combining deep reinforcement learning with search heuristics for solving multi-agent path finding in segment-based layouts," in 2020 IEEE Symposium Series on Computational Intelligence (SSCI). IEEE, 2020, pp. 2647-2654.

Z. Liu, B. Chen, H. Zhou, G. Koushik, M. Hebert, and D. Zhao, "Mapper: Multi-agent path planning with evolutionary reinforcement learning in mixed dynamic environments," in 2020 IEEE/RSJ International Conference on Intelligent Robots and Systems (IROS). IEEE, 2020, pp. 11 748-11 754.

X. Liu, H. Zhang, J. Lin, X. Chen, Q. Chen, and N. Mao, "A queuing network model for solving facility layout problem in multifloor flow shop," IEEE Access, vol. 10, pp. 61 326-61 341, 2022.

Z. Nie and K.-C. Chen, "Distributed coordination by social learning in the multi-robot systems of a smart factory," in 2021 IEEE Global Communications Conference (GLOBECOM). IEEE, 2021, pp. 01-06.

M. Rabin, "Inference by believers in the law of small numbers," The Quarterly Journal of Economics, vol. 117, No. 3, pp. 775-816, 2002.

D. Xia, C. Jiang, J. Wan, J. Jin, V. C. Leung, and M. Martinez-Garcia, "Heterogeneous network access and fusion in smart factory: A survey," ACM Computing Surveys, vol. 55, No. 6, pp. 1-31, 2022.

Y. Du, J. Li, C. Li, and P. Duan, "A reinforcement learning approach for flexible job shop scheduling problem with crane transportation and setup times," IEEE Transactions on Neural Networks and Learning Systems, pp. 1-15, 2022.

N. Kumar and J. Kumar, "Efficiency 4.0 for industry 4.0," Human Technology, vol. 15, No. 1, p. 55, 2019.

A. Grover and J. Leskovec, "node2vec: Scalable feature learning for networks," in Proceedings of the 22nd ACM SIGKDD international conference on Knowledge discovery and data mining, 2016, pp. 855-864.

W. Fedus, P. Ramachandran, R. Agarwal, Y. Bengio, H. Larochelle, M. Rowland, and W. Dabney, "Revisiting fundamentals of experience replay," in International Conference on Machine Learning. PMLR, 2020, pp. 3061-3071.

J. Fan, Z. Wang, Y. Xie, and Z. Yang, "A theoretical analysis of deep q-learning," in Learning for Dynamics and Control. PMLR, 2020, pp. 486-489.

N. Agarwal, S. Goel, and C. Zhang, "Acceleration via fractal learning rate schedules," in Proceedings of the 38th International Conference on Machine Learning, ser. Proceedings of Machine Learning Research, M. Meila and T. Zhang, Eds., vol. 139. PMLR, Jul. 18-24, 2021, pp. 87-99. [Online]. Available: https://proceedings.mlr.press/v139/agarwal21a.html.

A. Al Zoobi, D. Coudert, and N. Nisse, "Space and Time Trade-Off for the k Shortest Simple Paths Problem," in SEA 2020—18th International Symposium on Experimental Algorithms, ser. Leibniz International Proceedings in Informatics (LIPIcs), vol. 160, No. 18. Catania, Italy: Schloss Dagstuhl-Leibniz-Zentrum fur Informatik, Jun. 2020, p. 13. [Online]. Available: https://hal.inria.fr/hal-02865918.

J. Schulman, P. Moritz, S. Levine, M. Jordan, and P. Abbeel, "High-dimensional continuous control using generalized advantage estimation," International Conference on Learning Representations (ICLR), 2016.

(56)                    References Cited

OTHER PUBLICATIONS

R. S. Sutton and A. G. Barto, Reinforcement learning: An introduction. MIT press, 2018.

R. Mirsky, I. Carlucho, A. Rahman, E. Fosong, W. Macke, M. Sridharan, P. Stone, and S. V. Albrecht, "A survey of ad hoc teamwork: Definitions, methods, and open problems," in European Conference on Multi-agent Systems, 2022.

L. Zhao and K.-C. Chen, "The game theoretic consensus in a networked multi-agent system," in 2018 IEEE Global Communications Conference (GLOBECOM). IEEE, 2018, pp. 1-7.

W. B. Powell, Reinforcement Learning and Stochastic Optimization: A Unified Framework for Sequential Decisions. John Wiley & Sons, 2022.

B. Yuan, J. Wang, P. Wu, and X. Qing, "Iot malware classification based on lightweight convolutional neural networks," IEEE Internet of Things Journal, vol. 9, No. 5, pp. 3770-3783, 2022.

T. Rashid, M. Samvelyan, C. S. De Witt, G. Farquhar, J. Foerster, and S. Whiteson, "Monotonic value function factorisation for deep multi-agent reinforcement learning," The Journal of Machine Learning Research, vol. 21, No. 1, pp. 7234-7284, 2020.

R. Lowe, Y. I. Wu, A. Tamar, J. Harb, O. Pieter Abbeel, and I. Mordatch, "Multi-agent actor-critic for mixed cooperative-competitive environments," Advances in neural information processing systems, vol. 30, 2017.

* cited by examiner (a)

(b)

$task^m = (v^m_{fp}, x_p, y_p, v^m_{fa}, x_a, y_a, \tau^m_{due, pickup}, \tau^m_{due, deliver})$ (a) Delay.

(b) Energy consumption.

(c) Shortest time ratio.

(d) Collective objective (negative).

(e) Global reward.

(f) Local reward.

(g) MSE loss of the global critic.

(h) Smooth L1 loss of local critics.

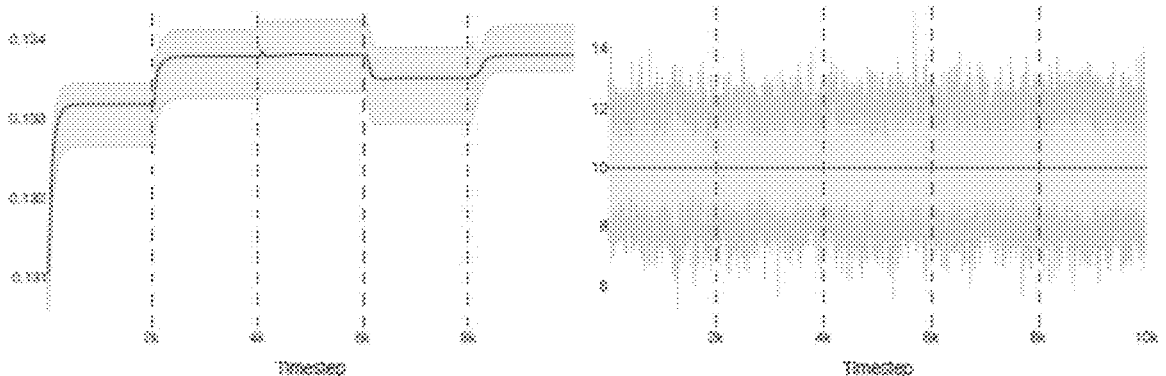
(a) Variance of KL divergence.          (b) Tokens (time average).
FIG. 11A          FIG. 11B

PREDICTIVE PATH COORDINATION IN MULTI-ROBOT SYSTEMS

CROSS-REFERENCE TO RELATED APPLICATIONS

This application claims the benefit of and priority to U.S. Provisional Patent App. No. 63/491,746, filed Mar. 23, 2023, the content of which is incorporated herein by reference in its entirety.

BACKGROUND

Smart factories employ intelligent transportation systems such as Autonomous Mobile Robots (AMRs) to support real-time adjusted production flows for agile and flexible production. While decentralized transportation task execution provides a scalable transportation Multi-Robot System (MRS) for a smart factory, new coordination challenges arise in implementing such a system. Transportation-MRS collaborates with production-MRS to accommodate Just-In-Time (JIT) production, leading to nonstationary transportation tasks that transportation-MRS must learn and adapt to. Also, decentralized operation on a shared shop floor means that one robot cannot factor in peer robots' in task execution planning, leading to competitive collisions. Meanwhile, predictively coordinating with communication among multiple learning and adapting intelligent robots is still an open problem.

SUMMARY

Embodiments of the present disclosure provide a multi-floor transportation graph model to discretize transportation task execution and allow real-time adjustment of transportation paths toward collision-free.

This disclosure formulates smart factory transportation as a multi-AMR discrete navigation problem, with all AMRs taking discrete navigation steps in a multi-floor graphical model to optimize task execution collaboratively. Each AMR utilizes the feedback from interacting with changing transportation tasks and other AMRs via collision resolution to adaptively improve their performance by utilizing stochastic optimization to take coordinated path plans in a predictive manner. This is implemented by a multi-agent reinforcement learning algorithm with critic mixing that is tailored for the transportation-MRS in smart factories. Computational experiments demonstrate that the transportation-MRS quickly achieves near-optimal performance that empirically scales with the number of AMRs.

Disclosed herein is a unique collaborative multi-intelligent robot system approach taking each robot as a cyber-physical agent with automated artificial intelligence (AI) workflow. First, it includes a novel multi-agent reinforcement learning (MARL) algorithm, where each robot predictively plans collision-avoidant paths. Second, we introduce a token-passing mechanism to resolve inevitable competitive collisions due to non-stationary tasks. The proposed approach innovatively uses the multi-floor model as a domain model for planning. By allowing competitive collision to happen and resolve, a robot only needs to learn and adapt to uncertain parts of the environment-non-stationary tasks and peer robots' paths. Computational experiments show that our approach is both sample-efficient and computationally efficient. The transportation-MRS quickly reaches near-optimal performance levels, which are empirically shown to scale with the number of robots involved.

In multi-agent environments, the dynamics often involve a blend of both collaboration and competition, mirroring the complexities of real-world systems such as biological ecosystems, social networks, or economic markets. A cyber-physical AI agent system is particularly beneficial in navigating these complex collaborative-competitive landscapes, transcending the capabilities of isolated, single intelligent agents. When resources are limited, a natural competition arises among agents. However, the effective utilization of these scarce resources often necessitates collaboration. The proposed approach facilitates this by enabling more coordinated resource allocation compared to systems that merely duplicate single intelligent agents. Agents in the system are typically oriented toward both shared and individual goals. While the pursuit of individual objectives might lead to competition, working towards common goals naturally promotes collaboration. The cyber-physical AI agent system framework enhances this balance by promoting intelligent collaboration where needed, without sacrificing beneficial competition. Partial observability of the system often complicates the agents' decision-making processes. In such cases, the collaborative mechanisms within the system prove advantageous, helping to mitigate the uncertainties arising from the limited information of peer agents. Communication serves as a foundation for the efficacy of this approach, especially in mixed collaborative-competitive settings. Agents can use explicit communication to coordinate actions, thereby optimizing the attainment of shared objectives. They can also share critical information about environmental changes, new constraints, or shifts in goals, allowing each agent to make more informed decisions. Resource conflicts are inevitable in environments where multiple agents vie for the same limited assets. In a cyber-physical AI agent system, communication can streamline negotiation processes to rationally resolve these conflicts, thus preserving the system's collaborative goals. Moreover, sustained communication within the system can help build reputations for reliability and trustworthiness among agents. This facilitates a convention of effective collaboration for future interactions. Over time, this regular communication also helps establish communal norms or "unwritten rules", which serve as guiding principles in scenarios where formal rules may be lacking or ambiguous. By excelling in these aspects, a cyber-physical AI agent system offers a significant advancement over systems that simply duplicate single agents, presenting a more nuanced and effective approach for managing the intricate dynamics of complex collaborative-competitive environments.

One implementation of the present disclosure is a multi-robot system comprising an edge server and a plurality of robots in electronic communication with one another and the edge server, where each robot is configured to: receive at least one transportation task; determine an optimal path for executing the at least one transportation task based at least in part on: (i) one or more transportation task parameters, (ii) a shared global critic function accessible to the plurality of robots, and (iii) a local critic function unique to the respective robot, and execute the at least one transportation task in accordance with the determined optimal path, wherein each of the plurality of robots is configured to initiate a token-passing based resolution to resolve potential collisions with one another in real-time.

In another implementation, a method of operating a first robot in a multi-robot system is provided. The method can include: receiving, by the first robot, at least one transportation task; determining, by the first robot, an optimal path for executing the at least one transportation task based at least in part on: (i) one or more transportation task parameters, (ii) a shared global critic function accessible to the first robot and at least one additional robot, and (iii) a local critic function unique to the first robot; and executing, by the first robot, the at least one transportation task in accordance with the determined optimal path.

In another implementation, a non-transitory computer-readable medium is provided. The non-transitory computer-readable medium can comprise a memory having instructions stored thereon to cause a processor to: receive at least one transportation task; determine an optimal path for executing the at least one transportation task via at least one robot based at least in part, on: (i) one or more transportation task parameters, (ii) a shared global critic function accessible to a plurality of robots, and (iii) a local critic function unique to each of the plurality of robots, and cause execution of the transportation task in accordance with the determined optimal path, wherein the at least one robot is configured to initiate a token-passing based resolution to resolve potential collisions with one another in real-time.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

FIG. 11A and FIG. 11B are graphs depicting additional experimental results with a 31-robot system in a multi-floor model.

Figures 1A, 1B, 1C:
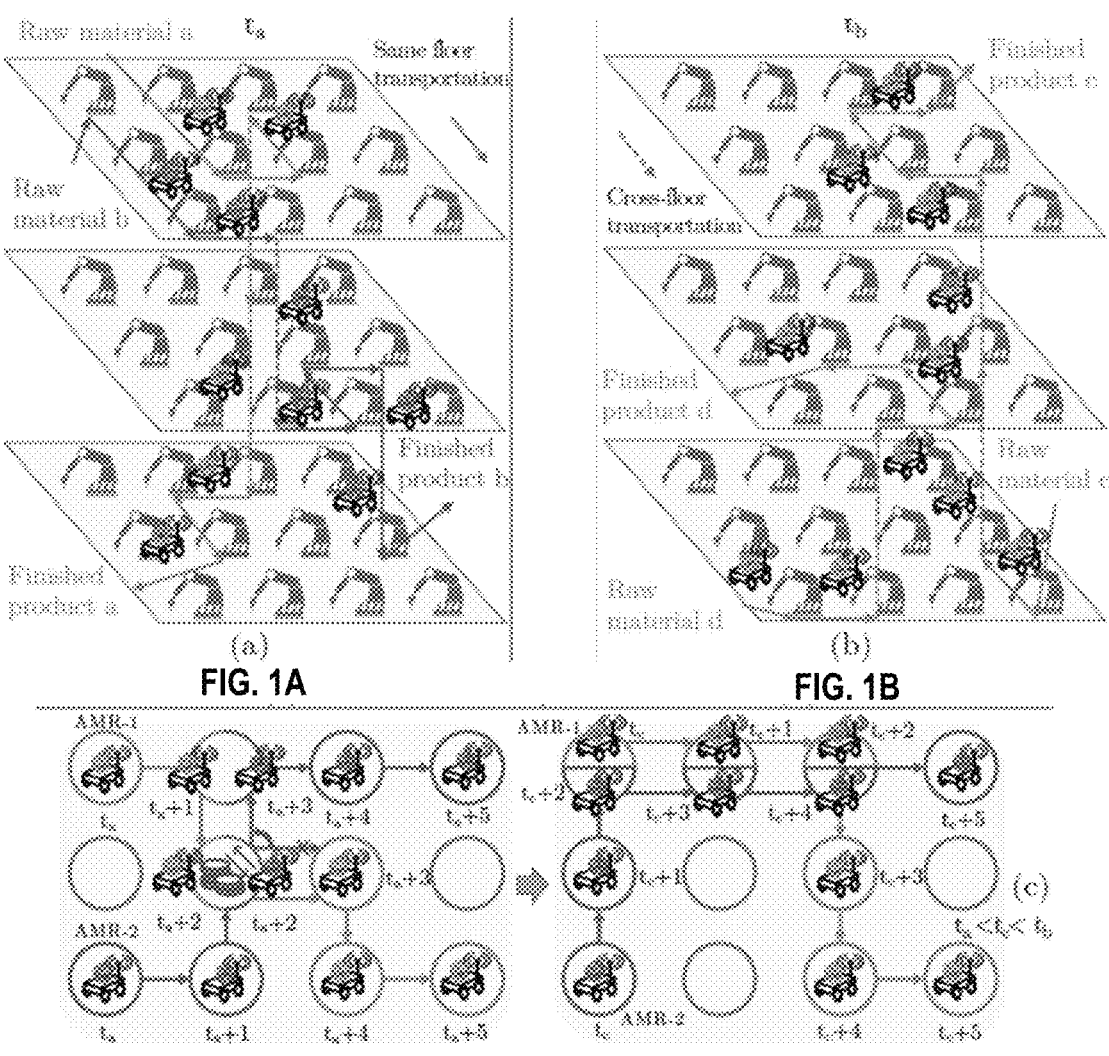
FIG. 1A and FIG. 1B are schematic diagrams depicting an example multi-robot system (MRS) in accordance with certain implementations described herein.
FIG. 1C shows a proposed coordination strategy in accordance with certain implementations described herein.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Described herein are smart factories driven by Multi-Robot Systems (MRSs) driven by Multi-Robot Systems (MRSs) that are modeled as cyber-physical systems consisting of a transportation-MRS and a production-MRS, enable flexible, agile, and efficient productivity and resource utilization, with scalability and resilience [1].

An Artificial Intelligence (AI)-enabled transportation-MRS decentralized operates on a shared multi-floor environment to achieve agile and flexible production in a smart factory [2], [3] as depicted in FIG. 1A and FIG. 1B. Edge computing performs real-time multi-robot task allocation (MRTA) [4] and dynamically assigns production tasks to production-MRS according to production demands and dynamic transportation tasks to transportation-MRS. Since the shared shop floor, competitive collisions happen when multiple robots are located at the same location and intend to take the same navigation step, which can be resolved or avoided towards collision-free. Transportation-MRS accomplishes transportation tasks assigned by edge computing via predictive collision-avoidant path planning, discrete navigations with real-time adjustments and competitive collision resolution toward collision-free operation. As illustrated in FIG. 1A and FIG. 1B, this operation paradigm allows the production flows to change from a and b to c and d between time $t_a$ and $t_b$ and transportation-MRS autonomously adapts to the changes.

Contrasting to conventional industrial autonomous transportation, techniques such as conveyor belts, assembly lines, and Autonomous Guided Vehicles (AGVs) are designed to accommodate static production flows. Once such systems are tuned to satisfy productivity and energy efficiency, they lose the adaptability to dynamic changes in Just-In-Time (JIT) production demands [5]. Moreover, unlike warehouse logistics with Autonomous Mobile Robots (AMRs), transportation tasks in smart factories do not begin or end at a single fixed location and have precise due time because they are parts of production flows [6]. Literature such as [7] and [8] formulate smart factory transportation as multi-path scheduling that optimizes the delay and energy consumption. Yet, they cannot address the adaptation to the transportation tasks supporting dynamic production flows in a smart factory. Also, [9] and [10] formulate the path following control for industrial AGVs but cannot address the path constraints from the shared shop floor and thus are inapplicable for smart factories.

Despite the benefits of scalability from decentralized operation, applying AI-enabled transportation-MRS in a smart factory faces new challenges in coordination.

First, a smart factory accommodating JIT production introduces non-stationary transportation tasks to transportation-MRS. The task execution must adapt to the transportation tasks with constantly new statistic characteristics in order to maintain delay and energy consumption performance. Although the Markov Decision Process (MDP) is widely adapted to model sequential decision problems such as transportation, its dimension increases with the introduction of more robots. Furthermore, common multi-dimensional MDPs cannot account for the non-stationary transportation tasks and real-time adjusted execution because of the various task execution times. Literature such as [11], [12] and [6] model discrete navigation as MDP but lack illustration about optimizing transportation task performance.

Second, decentralized path planning cannot guarantee collision-free task execution since one robot's path planning cannot factor in the plans of other robots. This is particularly challenging in real-time, end-to-end transportation tasks where re-planning is required when competitive collision, deviation, and deadlocks happen. Furthermore, due to the expanded dimension of the shop floor, predicting all robots' path plans for coordination is not a scalable smart factory solution even for edge computing. Literature such as [13] and [14] address end-to-end multi-agent pickup and delivery problems but without agent-based modeling, which means those methods' time complexity grows exponentially with increased robot number and thus difficult to optimize.

Third, on top of discrete navigation enabled by Artificial Intelligence (AI) decision-making, a communication-based collaboration is needed to automate and regulate the information collection and exchange from task completion, and collision resolutions to optimize performance. Literature such as [15] and [16] propose such mechanisms in urban traffic scenarios while the effective, scalable mechanism for a multi-floor smart factory is still an open problem.

This paper proposes a unique coordination strategy enabled by decentralized cyber-physical AI agents [17] as transportation-MRS, depicted by FIG. 1A, FIG. 1B, and FIG. 1C. This strategy allows competitive collisions to happen and resolve, which can lead to enlarged delay in task execution. Meanwhile, MRS learn from the collision resolution, so that they can take optimal or near-optimal plans to avoid competitive collisions in a predictive manner, as illustrated by $t_a$ to $t_c$ in FIG. 1A, FIG. 1B, and FIG. 1C. We implement such a strategy as a multi-agent reinforcement learning (MARL) framework under a collaborative-competitive environment [18], optimizing the average task execution delay and energy consumption assisted by the multi-floor model.

Literature such as [19], [20] and [21] also adopt reinforcement learning frameworks to resolve multi-agent path planning in dynamic, non-industrial environments, but they are yet to address the optimization of non-stationary transportation tasks in a multi-floor smart factory.

To highlight the technical contributions, this disclosure offers a novel modeling of smart factory transportation by treating it as a multi-robot discrete navigation problem within a multi-floor domain model, complete with path constraints and nonstationary tasks. It enables real-time adaptivity and collision-free task executions. To address the challenges introduced by decentralized operation, we introduce a unique collaborative multi-intelligent robot system approach to realize the proposed coordination strategy. In this approach, each robot is given greedy path planning based on the domain model, and a predictive collision-avoidant plan selection is implemented as the actor-mixed-critics MARL algorithm. The MARL architecture is thoughtfully designed, featuring a shared, centralized, collaboratively-trained global critic, along with distributed local critics for each robot. Additionally, we introduce a token-passing mechanism to resolve competitive collisions, which automates inter-robot communication to ensure collision-free operations. By allowing competitive collision to happen and resolve, transportation-MRS learn and adapt towards optimizing collective performance without explicitly predicting nonstationary tasks and peer robots' plans. Through computational experiments across various scales of transportation-MRS and shop floor sizes, we demonstrate that our collaborative multi-intelligent robot system achieves optimization of both delay and energy consumption.

This disclosure details the transportation-MRS model, graphical multi-floor model, and transportation-MRS discrete navigation problem, illustrates the technical implementation that addresses smart factory transportation including the multi-agent actor-mixed-critics algorithm and token-passing-based collision resolution, and shows the computational experiment results demonstrating effectiveness, optimality, and scalability.

Example System

Figure 1D:
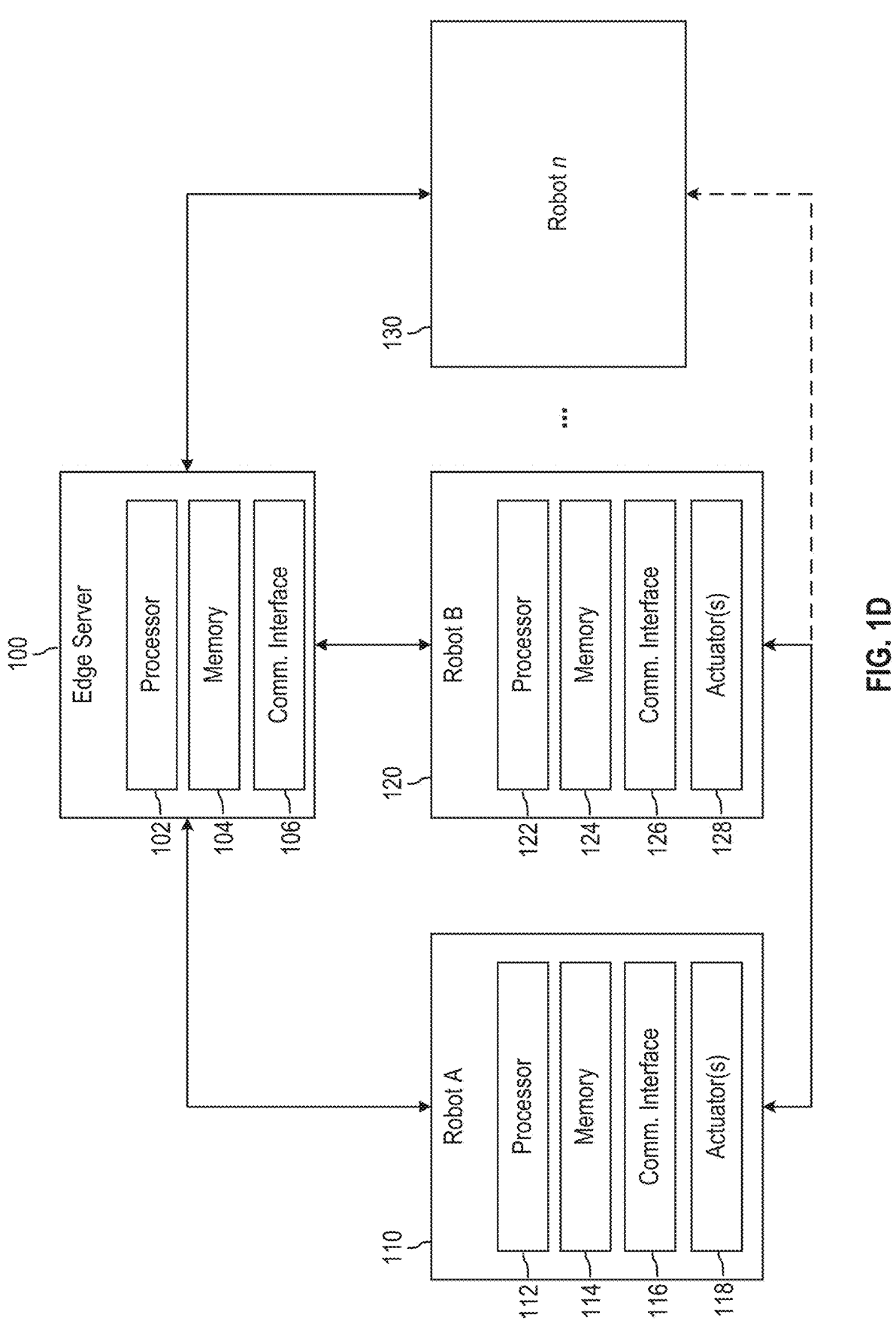
FIG. 1D is a block diagram of an example MRS in accordance with certain implementations described herein.

Referring now to FIG. 1D, a block diagram of an example MRS having multiple individual robots that communicate with a remote device is shown, according to some implementations. Specifically, the MRS is shown to include an edge server 100 and a plurality of robots 110, 120, and 130. It should be understood that the MRS may include any number of robots (e.g., n number of robots). In some implementations, the MRS is representative of an MRS that operates in a factory or other similar setting. In some such implementations, robots 110, 120, and 130 may be industrial robots that, together, fabricate or manufacture a product. It should be appreciated, however, that robots 110, 120, and 130 may be any robot device(s) that are configured to operate cooperatively. For example, robots 110, 120, and 130 may be autonomous or semi-autonomous vehicles, drones, and the like.

Each of edge server 100, robot 110, and robot 120 are shown to include a processor and a memory, denoted as processors 102, 112, 122 and memory 104, 114, 124, respectively. While not shown, it should be appreciated that robot 130 and any other robots of the MRS may also include the same components as robots 110, 120. Processors 102, 112, 122 can be general-purpose processors, ASICs, one or more FPGAs, groups of processing components, or other suitable electronic processing structures. In some embodiments, processors 102, 112, 122 are configured to execute program code stored on respective memory 104, 114, 124 to cause edge server 100, robot 110, and/or robot 120 to perform one or more operations, as described below in greater detail. It will be appreciated that, in embodiments where edge server 100, robot 110, and/or robot 120 are part of another computing device, the components of edge server 100, robot 110, and/or robot 120 may be shared with, or the same as, the host device.

Memory 104, 114, 124 can include one or more devices (e.g., memory units, memory devices, storage devices, etc.) for storing data and/or computer code for completing and/or facilitating the various processes described in the present disclosure. In some embodiments, memory 104, 114, 124 includes tangible (e.g., non-transitory), computer-readable media that stores code or instructions executable by processors 102, 112, 122. Tangible, computer-readable media refers to any physical media that is capable of providing data that causes a respective one of edge server 100, robot 110, and/or robot 120 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 104, 114, 124 can include RAM, ROM, hard drive storage, temporary storage, non-volatile memory, flash memory, optical memory, or any other suitable memory for storing software objects and/or computer instructions. Memory 104, 114, 124 can include database components, object code components, script components, or any other type of information structure for supporting the various activities and information structures described in the present disclosure. Memory 104, 114, 124 can be communicably connected to processors 102, 112, 122, such as via processing circuit, and can include computer code for executing (e.g., by processors 102, 112, 122, respectively) one or more processes described herein.

While shown as individual components, it will be appreciated that processors 102, 112, 122 and/or memory 104, 114, 124 can be implemented using a variety of different types and quantities of processors and memory. For example, each of processors 102, 112, 122 may represent a single processing device or multiple processing devices. Similarly, each memory 104, 114, 124 may represent a single memory device or multiple memory devices. Additionally, in some embodiments, any of edge server 100, robot 110, and/or robot 120 may be implemented within a single computing device (e.g., one server, one housing, etc.). In other embodiments, any of edge server 100, robot 110, and/or robot 120 may be distributed across multiple servers or computers (e.g., that can exist in distributed locations). For example, edge server 100 may include multiple distributed computing devices (e.g., multiple processors and/or memory devices) in communication with each other that collaborate to perform operations. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

Additionally, each of edge server 100, robot 110, and robot 120 are shown to include a communications interface 106, 116, 126, respectively, that facilitates communication of data, control signals, and/or other information. For example, communications interface 116 of 'Robot A' can provide means for transmitting data to, or receiving data from, edge server 100 and/or robot 120. Accordingly, communications interfaces 106, 116, 126 can be or can include a wired or wireless communications interface (e.g., jacks, antennas, transmitters, receivers, transceivers, wire terminals, and the like) for conducting data communications, or a combination of wired and wireless communication interfaces. In some embodiments, communications via communications interfaces 106, 116, 126 are direct (e.g., local wired or wireless communications) or via a network (e.g., a WAN, the Internet, a cellular network, and the like). For example, communications interfaces 106, 116, 126 may include one or more Ethernet ports for communicably coupling to a network (e.g., the Internet). In another example, communications interfaces 106, 116, 126 can include a Wi-Fi transceiver for communicating via a wireless communications network. In yet another example, communications interfaces 106, 116, 126 may include cellular or mobile phone communications transceivers.

In some implementations, each of robots 110, 120, 130 can also include one or more actuators-shown as actuators 118, 128—that can be controlled by processors 112, 122 based on instructions from memory 114, 124, respectively. In other words, processors 112, 122 can execute instructions from memory 114, 124, respectively, to control actuators 118, 128. In some implementations, actuators 118, 128 are components of robots 110, 120 themselves. In other implementations, actuators 118, 128 are external to robots 110, 120, but are still controlled by robots 110, 120. In an industrial robot, for example, actuators 118, 128 may include motors, servos, linear actuators, and/or any other component(s) that can cause the robot(s) to move and/or to manipulate a material/component for production.

Generally, the MRS shown in FIG. 1D, and the components thereof, can be configured to implement an AI network methodology and corresponding processes described herein. To this point, robots 110, 120, and/or 130 may be configured to form "communities" in order to perform tasks (e.g., fabricating a product). Within a "community," robots can share data for making control decisions. In addition, each of robots 110, 120, and 130 can communicate to edge server 100—either directly or through a network and/or gateway device—to report operating and configuration data, and the like. Additionally, edge server 100 may provide commands, configuration data, and other information to robots 110, 120, and 130. In some implementations, edge server 100 can identify one or more robots 110, 120, and 130 that require maintenance and/or can track maintenance statuses, decisions, and/or history for robots 110, 120, and 130.

Figure 1E:
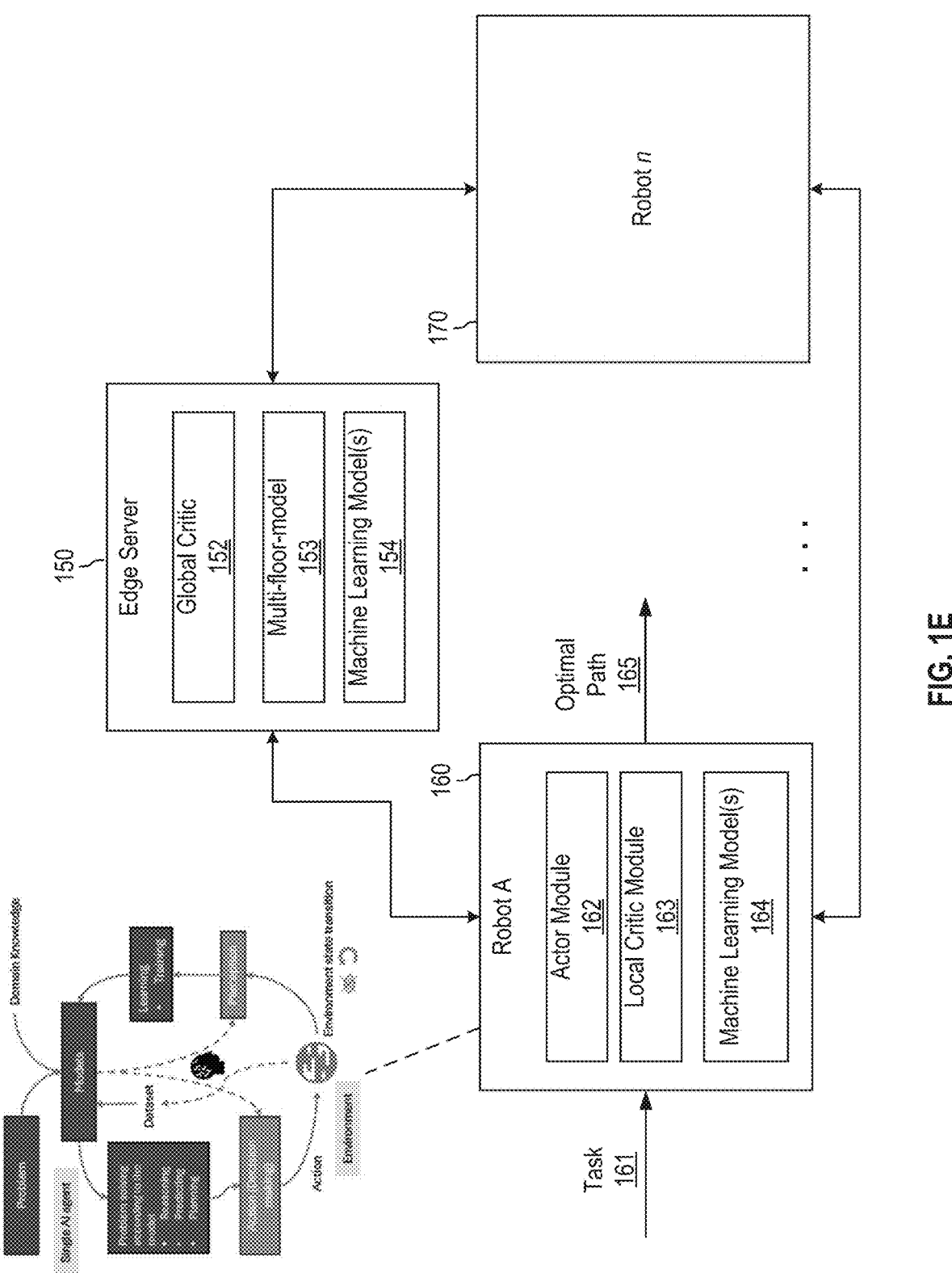
FIG. 1E is another a block diagram of an example MRS in accordance with certain implementations described herein.

FIG. 1E is another a block diagram of an example MRS (e.g., factory MRS) having multiple individual robots that communicate with a remote device, according to some implementations. Specifically, the MRS is shown to include an edge server 150 and a plurality of robots 160, 170. It should be understood that the MRS may include any number of robots (e.g., n number of robots). In various implementations, each of the robots is configured to continuously determine optimal paths for executing various transportation tasks and initiate a token-passing based resolution to resolve potential collisions with one another in real-time.

As depicted in FIG. 1E, the edge server 150 includes a global critic 152, a multi-floor-model 153, and one or more machine learning model(s) 154. In some implementations, at least some of the components of the edge server 150 are embodied as one or more other computing devices (e.g., a robot, a network of computing devices, a database, combinations, thereof, or the like).

As further depicted in FIG. 1E, a first robot 160 includes an actor module 162, a local critic module 163, and one or more machine learning model(s) 164. The first robot 160 is configured to receive at least one transportation task 161 and determine an optimal path 165 for executing the transportation task 161. In various implementations, the first robot 160 is configured to modify the determined path based on detected changes within its environment in a manner that optimizes speed, accuracy, shared goals, and energy conservation.

Example Method

Figure 2:
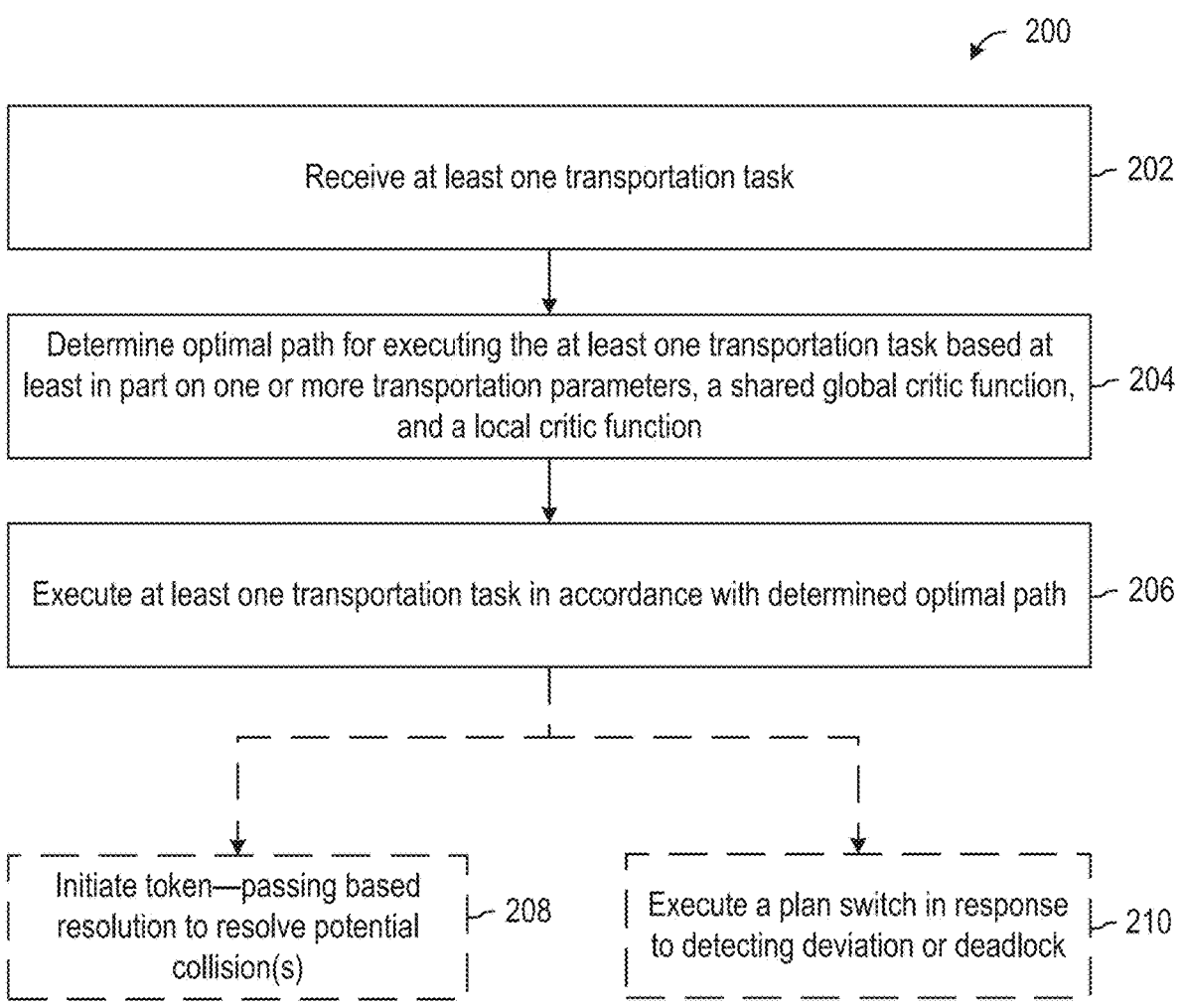
FIG. 2 is a flow chart diagram of an example method for controlling or operating a robot in an MRS in accordance with certain implementations described herein.

Referring now to FIG. 2, a flow chart diagram of an example method 200 for controlling or operating a robot in an MRS is shown, according to some implementations. Generally, the method 200 is implemented by the MRS described above. In particular, the method 200 may be implemented by each/any of robots 110, 120, and 130. In some implementations, one or more steps/operations of the method 200 may be performed by edge server 100. It will be appreciated that certain steps of method 200 may be optional and, in some implementations, the method 200 may be implemented using less than all of the steps. It will also be appreciated that the order of steps shown in FIG. 2 is not intended to be limiting.

At step/operation 202, the method 200 includes receiving at least one transportation task. In various implementations, the at least one transportation task is provided by another robot, an edge server (e.g., edge server 100), or another computing device, for example, operated by a user (e.g., factory manager).

At step/operation 204, the method 200 includes determining an optimal path for executing the at least one transportation task based at least in part on one or more transportation task parameters, a shared global critic function, and a local critic function.

The term global critic function can refer to a centralized entity or function that evaluates performance of an entire environment while the term local critic function can refer to a network or function that provides feedback on performance or value of a specific agent or subset of agents in a multi-agent system (e.g., one robot or a subset of a plurality of robots). The shared global critic function is accessible by a plurality of robots within a multi-robot environment. For example, the shared global critic function can be a neural network model and can facilitate predicting a global reward corresponding to a contribution of a pickup or delivery path. In contrast, a local critic function is unique to a particular robot. In some examples, the transportation task parameters include at least one of a pickup vertex, a delivery vertex, a target pickup time, a target delivery time, and energy efficiency.

In some implementations, the optimal path is determined based at least in part on a multi-floor graph-based model (e.g., $G_{floor}$, as described herein). For example, a robot can determine the optimal path by applying a random walk-based path embedding algorithm to the multi-floor graph-based model. Each of a plurality of robots can be configured to continuously determine global states and global rewards based at least in part on the shared global critic function. Additionally, each of the plurality of robots can be configured to continuously determine local states and local rewards based at least in part on its respective local critic function. In various implementations, the robots can use the determined global states, global rewards, local states, and local rewards to determine, modify, and/or optimize paths for executing transportation tasks in a continuous fashion.

In some implementations, each of a plurality of robots in a multi-robot system comprises one or more unsupervised machine learning models or deep learning models. For example, each robot can host and continuously train its own machine learning models. In some implementations, the one or more unsupervised machine learning models or deep learning models are trained using randomly generated and embedded paths.

At step/operation 206, the method 200 includes executing the at least one transportation task in accordance with the determined optimal path. In some implementations, a robot may receive a global reward in response to executing a pickup or delivery within a target time frame and receive a diminished global reward in response to failing to execute the pickup or delivery within the target time frame.

In some implementations, at step/operation 208, the method 200 includes initiating a token-passing based resolution to resolve a potential collision. For example, a first robot and a second robot may each have one or more tokens that are stored by and/or associated with the respective robot. A token may be or comprise a unit of data or information that represents a current state of the robot and/or the robot's environment. This disclosure contemplates that other feedback mechanism(s) (e.g., data objects, data entities) can be utilized. By way of example, in the event of a potential (e.g., predicted) collision between the first robot and the second robot where the first robot has more tokens than the second robot, then the first robot will be given priority in resolving the potential collision. For example, the first robot can continue on its current path while the second robot modifies its path. Additionally, and/or alternatively, a robot may give a portion of its tokens to another robot in exchange for maintaining its current path.

In some implementations, at step/operation 210, the method 200 includes executing a plan switch in response to detecting a deviation or deadlock. Competitive collisions can happen when robots perform distributed planning which can lead to deviation from path plans and even deadlocks. In such examples, a robot may execute a plan switch in response to determining that a potential collision cannot be resolved, for example, because the robots have the same number of tokens. As another example, a robot may execute a plan switch in an instance in which there is insufficient time to initiate a token-passing based resolution based on their current position(s), relative position(s), and/or current path(s). In some implementations, a plan switch for one or more robots can be triggered in an instance in which an above-threshold number of robots (e.g., twenty robots) are involved in a token-passing based resolution or if the issue can only be resolved by accruing excessive or above-threshold computational costs within the overall system.

Machine Learning

In addition to the machine learning operations described above, the exemplary system can be implemented using one or more artificial intelligence and machine learning operations. The term "artificial intelligence" can include any technique that enables one or more computing devices or comping systems (i.e., a machine) to mimic human intelligence. Artificial intelligence (AI) includes but is not limited to knowledge bases, machine learning, representation learning, and deep learning. The term "machine learning" is defined herein to be a subset of AI that enables a machine to acquire knowledge by extracting patterns from raw data. Machine learning techniques include, but are not limited to, logistic regression, support vector machines (SVMs), decision trees, Naïve Bayes classifiers, and artificial neural networks. The term "representation learning" is defined herein to be a subset of machine learning that enables a machine to automatically discover representations needed for feature detection, prediction, or classification from raw data. Representation learning techniques include, but are not limited to, autoencoders and embeddings. The term "deep learning" is defined herein to be a subset of machine learning that enables a machine to automatically discover representations needed for feature detection, prediction, classification, etc., using layers of processing. Deep learning techniques include but are not limited to artificial neural networks or multilayer perceptron (MLP).

Machine learning models include supervised, semi-supervised, and unsupervised learning models. In a supervised learning model, the model learns a function that maps an input (also known as feature or features) to an output (also known as target) during training with a labeled data set (or dataset). In an unsupervised learning model, the algorithm discovers patterns among data. In a semi-supervised model, the model learns a function that maps an input (also known as feature or features) to an output (also known as a target) during training with both labeled and unlabeled data.

Neural Networks. An artificial neural network (ANN) is a computing system including a plurality of interconnected neurons (e.g., also referred to as "nodes"). This disclosure contemplates that the nodes can be implemented using a computing device (e.g., a processing unit and memory as described herein). The nodes can be arranged in a plurality of layers such as input layer, an output layer, and optionally one or more hidden layers with different activation functions. An ANN having hidden layers can be referred to as a deep neural network or multilayer perceptron (MLP). Each node is connected to one or more other nodes in the ANN. For example, each layer is made of a plurality of nodes, where each node is connected to all nodes in the previous layer. The nodes in a given layer are not interconnected with one another, i.e., the nodes in a given layer function independently of one another. As used herein, nodes in the input layer receive data from outside of the ANN, nodes in the hidden layer(s) modify the data between the input and output layers, and nodes in the output layer provide the results. Each node is configured to receive an input, implement an activation function (e.g., binary step, linear, sigmoid, tanh, or rectified linear unit (ReLU) function), and provide an output in accordance with the activation function. Additionally, each node is associated with a respective weight. ANNs are trained with a dataset to maximize or minimize an objective function. In some implementations, the objective function is a cost function, which is a measure of the ANN's performance (e.g., error such as L1 or L2 loss) during training, and the training algorithm tunes the node weights and/or bias to minimize the cost function. This disclosure contemplates that any algorithm that finds the maximum or minimum of the objective function can be used for training the ANN. Training algorithms for ANNs include but are not limited to backpropagation. It should be understood that an artificial neural network is provided only as an example machine learning model. This disclosure contemplates that the machine learning model can be any supervised learning model, semi-supervised learning model, or unsupervised learning model. Optionally, the machine learning model is a deep learning model. Machine learning models are known in the art and are therefore not described in further detail herein.

A convolutional neural network (CNN) is a type of deep neural network that has been applied, for example, to image analysis applications. Unlike traditional neural networks, each layer in a CNN has a plurality of nodes arranged in three dimensions (width, height, depth). CNNs can include different types of layers, e.g., convolutional, pooling, and fully-connected (also referred to herein as "dense") layers. A convolutional layer includes a set of filters and performs the bulk of the computations. A pooling layer is optionally inserted between convolutional layers to reduce the computational power and/or control overfitting (e.g., by downsampling). A fully-connected layer includes neurons, where each neuron is connected to all of the neurons in the previous layer. The layers are stacked similar to traditional neural networks. GCNNs are CNNs that have been adapted to work on structured datasets such as graphs.

Bayesian Networks. Reasoning within the framework of a domain model involves applying logical inference and decision-making based on a specific set of rules, relationships, and entities defining the domain. A domain model sets the boundaries and guidelines for reasoning, ensuring that the outcomes are more consistent and accurate. Utilizing a domain model allows an AI agent to achieve a more nuanced understanding of the problem, enhancing the contextual relevance of its reasoning. Additionally, a domain model aids in efficiently navigating the solution space while adhering to predefined rules and relationships. It serves to refine complicated real-world scenarios into a manageable set of entities and relationships, thereby streamlining the reasoning process. When multiple AI agents operate within the same domain, a shared domain model facilitates interoperability by standardizing the rules and constraints underpinning their reasoning and decision-making.

Bayesian networks serve as a robust tool for representing probabilistic uncertainties and capturing interdependencies through conditional probabilities. A Bayesian network, also known as a Bayes net or belief network, is a directed graph where each node is annotated with quantitative probability information. While graph models are powerful domain models, they often fall short in terms of scalability—a requirement for smart factories. Each production robot in an MRS is connected to neighboring nodes in two distinct domains: the physical domain, defined by the production flow, and the cyber domain, characterized by a stochastic partially connected wireless network. In this reasoning process, Bayesian networks integrate information from upstream production robots in each production flow, along with domain knowledge obtained from task execution for reasoning. This forms a Bayesian network aimed at identifying the actuator errors that contribute to defects in completed products. The Bayesian network provides a scalable solution for reasoning about which robots are contributing to defects, adapting to the number of production robots within the MRS.

Smart Factory Transportation Model

Transportation-MRS in a Multi-floor Smart Factory. A multi-floor smart factory transportation environment is defined as an undirected graph $G_{floor}$ by tuple $(N_f, N_x, N_y)$, where each element represents the maximum value of the floor, x, and y coordinates, respectively. A robot may either move from one vertex to another linked vertex or stay put, termed as an "action" or a "navigation step" throughout this paper. This model spans a Euclidean space, specifically:

$N_f$ represents the number of floors, with values ranging from 1 to $N_f$.

Each individual floor is structured as an $N_x \times N_y$ lattice graph (also known as a square grid graph). Vertices within this graph correspond to either a production robot or a production cell. The x coordinates span from 1 to $N_x$, while the y coordinates range from 1 to $N_y$.

The edges of $G_{floor}$ characterize feasible navigation steps between adjacent vertices, whether through the floor, x, or y coordinates. Given the nature of adjacency, these edges are inherently undirected. When navigating within the same floor, vertices adjacent either in the x or y direction are interconnected, consistent with the properties of a lattice graph. For navigation between floors, typically facilitated by UAVs or elevators which come with their own constraints [22], only vertices adjacent in floor coordinates and located at the sides of the floor are connected. This is further elaborated in (1).

It's important to note that $G_{floor}$ is a cyclic graph, characterized by the presence of multiple graph cycles. Moreover, all edges within this graph bear weights, indicative of the energy consumption associated with navigation. The energy consumption is associated with the navigation steps along one of the coordinates, denoted as $\varepsilon_f, \varepsilon_x, \varepsilon_y$. The formal definition of $G_{floor}$ is presented in (1), where vertices denoted as $v_{i,j,k}$ in which the subscripts are sequenced by the floor, x, and y coordinates. Additionally, a vertex positioned at the side, expressed as $v_{i,j_{side},k_{side}}$, is located at the side of the ith floor, as elaborated in (1c) and (1e).

Figures 3A, 3B:
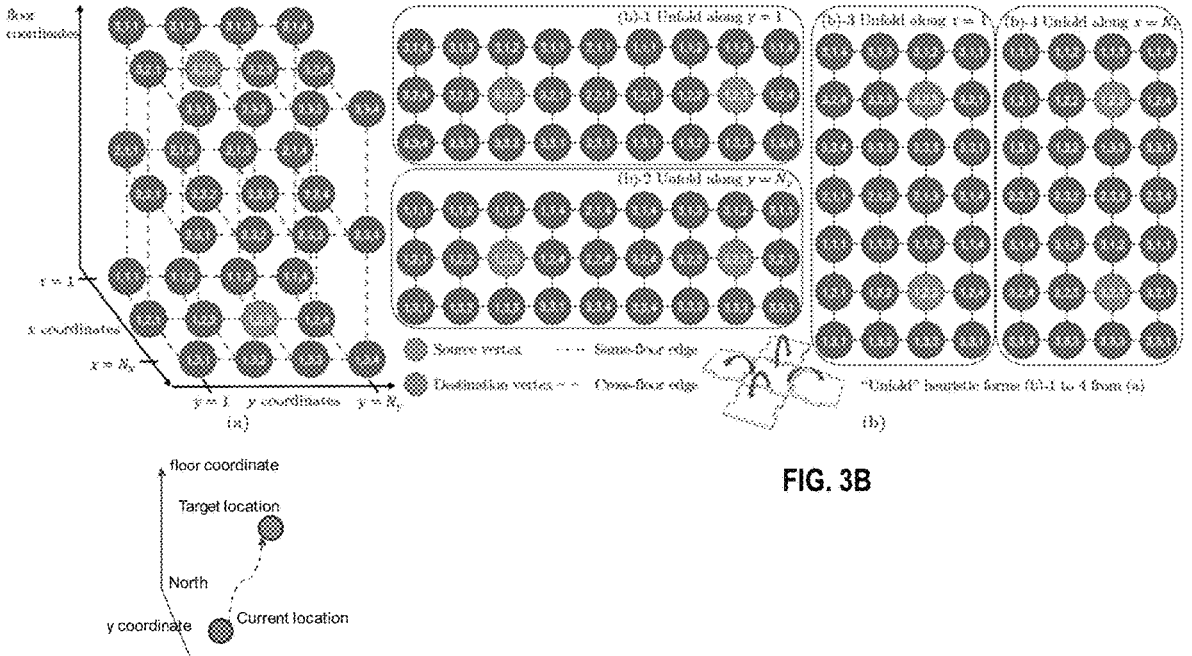
FIG. 3A and FIG. 3B are schematic diagrams showing a smart factory multi-floor model for transportation in accordance with certain implementations described herein.

FIG. 3A and FIG. 3B are schematic diagrams showing a smart factory multi-floor model for transportation. FIG. 3A provides a visualization of an example $G_{floor}$ characterized by ($N_f$=3, $N_x$=3, $N_y$=4). If a robot navigates from vertex $v_{1,2,3}$ to $v_{3,2,2}$ it would necessarily traverse the vertices situated on the sides of all three floors to facilitate cross-floor navigation.

$$G_{floor} = (V_{floor}, E_{floor}) \tag{1a}$$

$$V_{floor} = \{v_{i,j,k}\}, i = 1, \ldots, N_j, j = 1, \ldots, N_v, k = 1, \ldots, N_b \tag{1b}$$

$$E_{floor} = \{(v_{i,j,k}.v_{i,j',k'})\} \cup \{(v_{i,j_{idx},k_{idx}}, v_{i',j_{idx},k_{idx}})\} \tag{1c}$$

$$j' = j \pm 1, k' = k \pm 1, \tag{1d}$$

$$j_{side} = 1, N_c, k_{side} = 1, N_k, i' = i \pm 1 \tag{1e}$$

A transportation-MRS comprises K robots, hereafter referred to as K-robots, operating with synchronous discrete navigation in each time slot t. Every navigation step consumes one time slot, independent of energy consumption.

This synchronized approach promotes real-time adjustments ensuring collision-free operations, as corroborated by prior studies [1], [4], [23]. Given that industrial robots may have diverse navigation step durations, the time slot is designed to be flexible, accounting for longer navigation steps like cross-floor navigation. The multi-floor model acts both as the environment for the robot system and as a knowledge base for intelligent decision-making, given that both time and energy consumption metrics for navigation are predefined.

Non-Stationary Transportation Tasks

Despite all the navigation steps being synchronized, robots in the transportation-MRS execute transportation tasks in an end-to-end sequence, in which a new task is assigned upon completion of the prior one. This leads to asynchrony at the task execution level. As discussed above, JIT production demands necessitate reconfigurations of both MRSs, specifically, changes in production and transportation tasks. Nonetheless, between these reconfigurations, the transportation-MRS operates with a static set of tasks that reflect production tasks and flows. This dynamic nature means transportation task assignments for robots are inherently non-stationary and challenging to predict. They might be reconfigured a different set of tasks to serve adjusted production flows, reconfigured to support ongoing flows, or assigned a completely new task due to reconfiguration.

To model such non-stationarity, let $M^t$ represent the total number of transportation tasks, adjustable at reconfiguration intervals denoted by t=$t_1$, $t_2$, . . . . During each reconfiguration, a fresh set of $M^t$ tasks, $TS^t$ is computed, comprising pairs of pickup vertex $$v^m_{fp,xp,yp}$$

and delivery vertex $$v^m_{fd,xd,yd}$$

as defined in (2a). This task generation process is stochastic, characterized by (2b). $h_{DU}$ represents a discrete uniform distribution, designating two vertices from $G_{floor}$ for pickup and delivery purposes. Thus, according to the law of small numbers [24], each task set $TS^t$ is unique and non-stationary.

$$TS^t = \tag{2a}$$
$$\{(v^1_{fp,xp,yp}, v^2_{fd,xd,yd}), \ldots, (v^m_{fp,xp,yp}, v^m_{fd,xd,yd}), \ldots, (v^{M^t}_{fp,xp,yp}, v^{M^t}_{fd,xd,yd})\}$$

$$(v^m_{fp,xp,yp}, v^m_{fd,xd,yd}) = h_{DU}(2; 0, N_f \cdot N_x \cdot N_y) \tag{2b}$$

$$m = 1, 2, \ldots, M^t \tag{2c}$$

$$t = t_1, t_2, \ldots \tag{2d}$$

A transportation task, denoted as task$^m$ for m=1, 2, . . . , $M^t$, when assigned to robot-k, is characterized by the pickup vertex $$v^m_{fp,xp,yp}$$

deliver vertex $$v^m_{fd,xd,yd}$$

along with associated pickup and delivery due times, $$\tau^m_{due,pickup} \text{ and } \tau^m_{due,deliver}$$

respectively, as delineated in (3). Given that robot-k's current location at the time of assignment is $v_{f_d,x_d,y_d}{}^m$ it navigates to $$v^m_{fp,xp,yp}$$

for pickup and subsequently moves to $$v^m_{fd,xd,yd}$$

for delivery. The A* algorithm, represented by $h_{A*}$, computes the shortest feasible delay for both paths. However, as robots might not always opt for the shortest path, a margin parameter $\beta$ is introduced to adjust due times appropriately.

$$task^m = (v^m_{fp,xp,yp}, v^m_{fd,xd,yd}, \tau^m_{due,pickup}, \tau^m_{due,deliver}) \tag{3a}$$

$$\tau^m_{due,pickup} = (1 + \beta) \cdot h_A * (v_{f_k,x_k,y_k}, v^m_{fp,xp,yp}) \tag{3b}$$

$$\tau^m_{due,deliver} = (1 + \beta) \cdot h_A * (v_{fp,xp,yp}, v^m_{fd,xd,yd}) \tag{3c}$$

In summary, the set of transportation tasks is updated at the reconfiguration time slot (occurring every several hundred to thousand time slots [25]), as delineated by (2). Task assignments are made upon task completion by a robot, a necessity for adaptable smart factories. While efficient scheduling and assignment of production and transportation tasks are important for the practice of our method, they aren't central to our proposed approach. For such challenges, the real-time Multi-Robot Task Allocation in smart factories as explored by [4] is proposed and can be integrated with our methodology. In this work, we assign tasks in the task set to robots without bias, ensuring all tasks are executed equitably.

Task Execution as Adaptive Discrete Navigations

As described herein, smart factory robots are assigned new, non-stationary transportation tasks upon completion of the last one. Also, the time, or time slots of task executions (referred to as delay) varies since they depend on the robots' locations when tasks are assigned. Therefore, on top of path planning, robots must collaboratively and adaptively coordinate their path plans toward collision-free and optimized delay.

One navigation step that robot-k takes at time slot t is denoted by action at, which takes robot-k from vertex $v_{f,x,y}$ to a linked adjacent vertex $v_{f,x',y'}$ in $G_{floor}$, represented by shorthand denotation (4a). (4b) to (4h) formally defines the actions empirically "west", "south", "east", "north", "stay", "up-floor", and "down-floor" respectively and their numerical representations. The discrete action space for robots is thus A={0, 1, 2, 3, 4, 5, 6}.

Consider the modeling of the above two subsections, robot-k located at $v_{f_0,x_0,y_0}$ is assigned $task^m$ defined by (3) at time slot t, navigates to $v_{f_p,x_p,y_p}$ with $$\tau^m_{k,pickup}$$

time slots to pick up, then navigates to $v_{f_d,x_d,y_d}$ with $$\tau^m_{k,deliver}$$

time slots to deliver, which is a task execution. This procedure produce two walks in $G_{floor}$, respectively $$\rho^m_{k,pickup} \text{ and } \rho^m_{k,deliever},$$

defined by (5a) and (5b).

$$v_{f,x,y} \xrightarrow{a^t_k} v_{f',x',y'} \tag{4a}$$

$$a^t_k = 0 := f' = f, x' = x, y' = y - 1 \tag{4b}$$

$$a^t_k = 1 := f' = f, x' = x + 1, y' = y \tag{4c}$$

$$a^t_k = 2 := f' = f, x' = x, y' = y + 1 \tag{4d}$$

$$a^t_k = 3 := f' = f, x' = x - 1, y' = y \tag{4e}$$

$$a^t_k = 4 := f' = f, x' = x, y' = y \tag{4f}$$

$$a^t_k = 5 := f' = f + 1, x' = x - 1, y' = y \tag{4g}$$

$$a^t_k = 6 := f' = f - 1, x' = x - 1, y' = y \tag{4h}$$

Therefore, the delay (total time slots, completion time or makespan in some literature) and the energy consumption of completing $task^m$ by robot-k are given by (5c) and (5d) respectively. As defined herein, each navigation step takes one time slot, the delay is the number of vertices in walks $$\rho^m_{k,pickup} \text{ and } \rho^m_{k,deliever}$$

minus 1, which is also the number of actions forming each walk. Particularly in this section that emphasizes graphical modeling, we use the term "walk" instead of "path" since it's possible that robot-k takes the same vertex multiple times in a walk. In the rest of the paper, the term "path" is in the context of transportation instead of graph theory.

$$\rho^m_{k,pickup} = \left( v_{f_0,x_0,y_0} \xrightarrow{a^t_k} v_{f_1,x_1,y_1} \xrightarrow{a^{t+1}_k} v_{f_2,x_2,y_2} \xrightarrow{a^{t+\tau_{pickup}}_k} v^m_{f_p,x_p,y_p} \right) \tag{5a}$$

$$\rho^m_{k,deliver} = \left( v^m_{f_p,x_p,y_p} \xrightarrow{a^{t+\tau_{pickup}+1}_k} v_{f_0,x_0,y_0} \xrightarrow{a^{t+\tau_{pickup}+\tau_{deliver}}_k} v^m_{f_d,x_d,y_d} \right) \tag{5b}$$

$$\tau^m_k = \tau^m_{k,pickup} + \tau^m_{k,deliver} \tag{5c}$$

$$\varepsilon^m_k = h_{weight}\left(\rho^m_{k,pickup}\right) + h_{weight}\left(\rho^m_{k,deliver}\right) \tag{5d}$$

Competitive collision in task execution takes place when the robot set $$K^t_{f,x,y}$$

located at $v_{f,x,y}$ at time t. Given all planned actions $$a^t_k, k \in K^t_{f,x,y},$$

the action set does not exist as (6) since there are duplicated elements. Thanks to time synchronization, competitive collisions can be resolved by token-passing, detailed herein, which may lead robots to take the "stay" action and extend the delay.

$$\nexists \left\{ a^t_k \mid \forall\, a^t_k, k \in K^t_{f,x,y} \right\} \tag{6}$$

Delay and energy consumption are two major performance indicators of smart factory transportation [26] are thus adopted to evaluate the performance of transportation-MRS given by (7a) under the proposed multi-floor model, task model, and formulated discrete navigation problem. (7a) gives the evaluation function including the delay and energy consumption averaged by all completed tasks and by all robots. A Cobb-Douglas utility function [27] is adopted with α indicating the preference between delay and energy. (7b) suggests the delay and energy are derived from the task execution paths $$\rho^m_{k,pickup}, \rho^m_{k,deliver},$$

and those paths must fulfill $task^m$.

$$\text{maximize} - \frac{\sum_{k=1}^K \sum_{t=1}^T \sum_{m=1}^{M^t} (\tau^m_k)^\alpha (\varepsilon^m_k)^{1-\alpha}}{K \sum_{t=1}^T M^t} \tag{7a}$$

$$\text{s.t. } \exists\ \tau^m_k, \varepsilon^m_k \leftarrow \left(task^m, \rho^m_{k,pickup}, \rho^m_{k,deliver}\right) \tag{7b}$$

$$m = 1, 2, \ldots, M^t \tag{7c}$$

The goal of the MRS coordination, referred to as the collective objective, is to minimize the value of the evaluation in (7a). Task executions along with their delay and energy consumption are contributed by all robots' discrete navigation in transportation-MRS, which is a multi-agent optimization problem that addresses the first challenge discussed above.

Collaborative Multi-Intelligent Robot System with Domain Model for Path Coordination In this work, we propose a collaborative multi-intelligent robot system approach that employs a multi-floor transportation model as its domain model for planning. This approach seeks to collaboratively and predictively coordinate robots' paths during the entire task execution, aiming to complete tasks within due time and optimize the collective objective (7). Our approach has two key components to realize the strategy proposed above:

Collaborative Predictive Collision Avoidance: A multi-agent actor-mixed-critics algorithm is proposed to allow transportation-MRS to perform collaborative and predictive planning with the multi-floor model, avoiding competitive collisions. It addresses the second challenge described above. The algorithm has an architecture including a shared global critic module, supplemented by distributed local critic and actor modules associated with each robot.

Token-Passing-based Collision Resolution: If the aforementioned predictive planning fails to avoid competitive collisions, the colliding robots initiate a token-passing-based resolution. The resolution is collaborative, predictive, and distributed which addresses the third challenge identified above.

Figure 4:
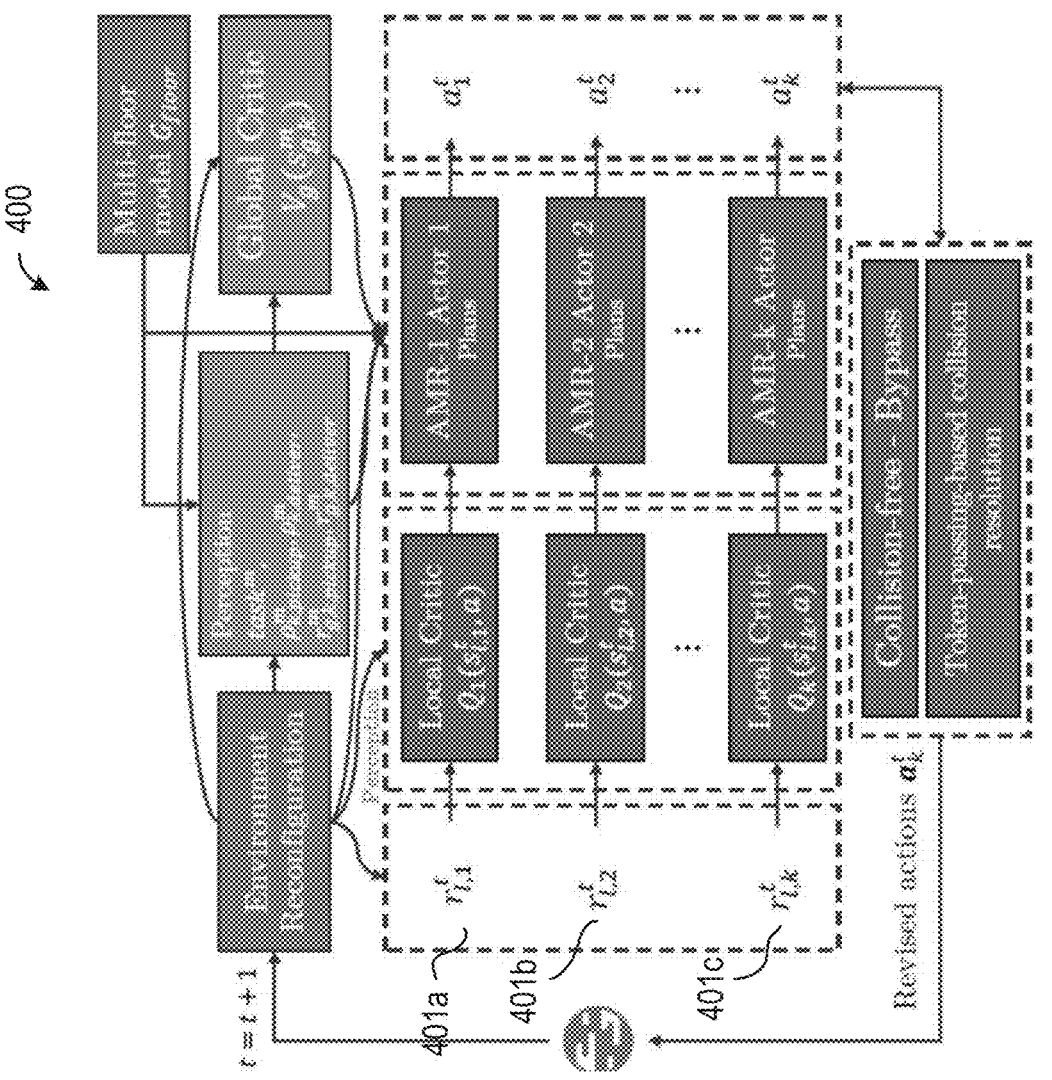
FIG. 4 depicts an example architecture of a decentralized, off-policy multi-agent actor-mixed-critics algorithm in accordance with certain implementations described herein.

The architecture 400 of our proposed decentralized, off-policy multi-agent actor-mixed-critics algorithm is illustrated in FIG. 4. In this intelligent cyber-physical agent system approach, robots lack direct control or predictive capacity over the multi-floor model, transportation tasks, and task reconfigurations and thus necessitate learning and adaptation.

As shown in FIG. 4, each robot (401a, 401b, 401c) possesses an actor module for planning upon receiving a transportation task assignment, utilizing predictions from both the shared global critic and its own local critic to decide a collision-avoidant path to execute. Given that this planning doesn't consider the plans of other robots, competitive collisions, when they arise, are resolved through token-passing among the colliding robots. These robots perceive their environment with the aid of the multi-floor model, generating global states, global rewards, local states, and local rewards. Instead, upon receiving task assignments, denoted as task$^m$, each robot's actor module performs planning in accordance with the multi-floor model $G_{floor}$, its local critic $Q_k$, and the global critic $V_k$ modules. The outcome plans are either collision-free or entail minimal collisions and are optimized to achieve optimal or near-optimal delays and thus denoted as collision-avoidant. To maintain clarity in this section, we persist in using g and l as subscripts for variables related to global and local critics, respectively and the critic denotation does not distinguish the time slots. A deeper exploration into the intricacies of critics and actors will be presented in subsequent subsections.

Learning Intelligent Agents with Global Critic and Local Critics

While the delay in task execution can be obtained only upon a task's completion, the global critic operates by taking pickup or delivery paths equivalently (referred to as paths or sequences of actions, as defined by (5)) as its input. Subsequently, it predicts a global reward, which mirrors the contribution of the path to timely task completion and the collective objective given by (7). Conversely, the local critic predicts individual robots' actions within the action space, focusing on collision avoidance based on the current location.

Consequently, these two critics operate with distinct temporal resolutions for both prediction and training, and these differences will be elaborated upon separately within this section.

Shared Global Critic: The global critic denoted as Vg, is a state-value function shared among all robots and is thus hosted via edge computing. This critic aims to predict the global reward corresponding to the contribution of a pickup or delivery path—sourced from either a plan or a task execution—to the timely task completion and the collective objective. This is perceived through the assigned task, task$^m$, and its corresponding path, $$\rho_k^m.$$

For the sake of simplicity, the paths are not differentiated based on pickup or delivery, as the global critic treats them equivalently. The term state-value function refers to a reinforcement learning and dynamic modeling concept representing an expected return that an agent expects to receive starting from a particular state and subsequent to following a particular policy. Said differently, a state-value function is indicative of whether or not it is positive for the agent (e.g., robot) to be in a given state under a certain policy and allows the agent to evaluate the desirability of a plurality of states in relation to one another.

The combined perception of task$^m$ and $$\rho_k^m$$

manifests as a global state $$s_{g,k}^m,$$

distinguishing between transportation task m and the specific robot-k. This state is represented by a numerical vector comprising six elements: (i) The initial four elements pertain to the embedded and encoded path $$\rho_k^m.$$

(ii) The fifth element signifies the energy consumption as elaborated in (5d). (iii) The sixth element denotes the remaining time slots to execute task$^m$. For planning purposes, this is equivalent to the due time as defined by (3); otherwise, it represents $$\tau_{due}^m - \tau_k^m.$$

Given that the count of vertices or actions within a pickup or delivery path can fluctuate based on planning or task execution specifics, embedding the path is important to establish a fixed-length numerical vector suitable for the global critic's input.

Moreover, to accommodate real-time adaptive task execution, dimension reduction becomes necessary to reduce the computational complexity of the training and prediction of the global critic. Thus, a random walk-based path embedding and a pre-trainable autoencoder are introduced.

---

Algorithm 1: Random walk-based path embedding

---

```
def PathEmbd (G_floor, N_ref, n_walks, n_steps, p_walks, q_walks, ρ_k^m):
    Result: Embed_vector
1   Embed_vector ← Ø
2   for v in N_ref:
3      Walks - node2vec_walk
       (G_floor, n_walks, n_steps, p_walks, q_walks)
4      counter = 0
5      for walk in Walks:
6         for vertex in ρ_k^m:
7            if vertex in walk:
8               counter+ = 1
9         Coded_vector ← counter
10   Embed_vector ← AutoEnc (Coded_vector)
```

---

A random walk-based path embedding algorithm inspired by [28] is introduced. $n_{walks}$ random walks start from a fixed set of reference vertices $N_{ref}$ are performed with $n_{steps}$. Similar to [28], return parameter $p_{walks}$ and in-out parameter $q_{walks}$ are implemented so that search biases are $$\frac{1}{p_{walks}}, 1, \frac{1}{q_{walks}}.$$

Figures 5A, 5B:
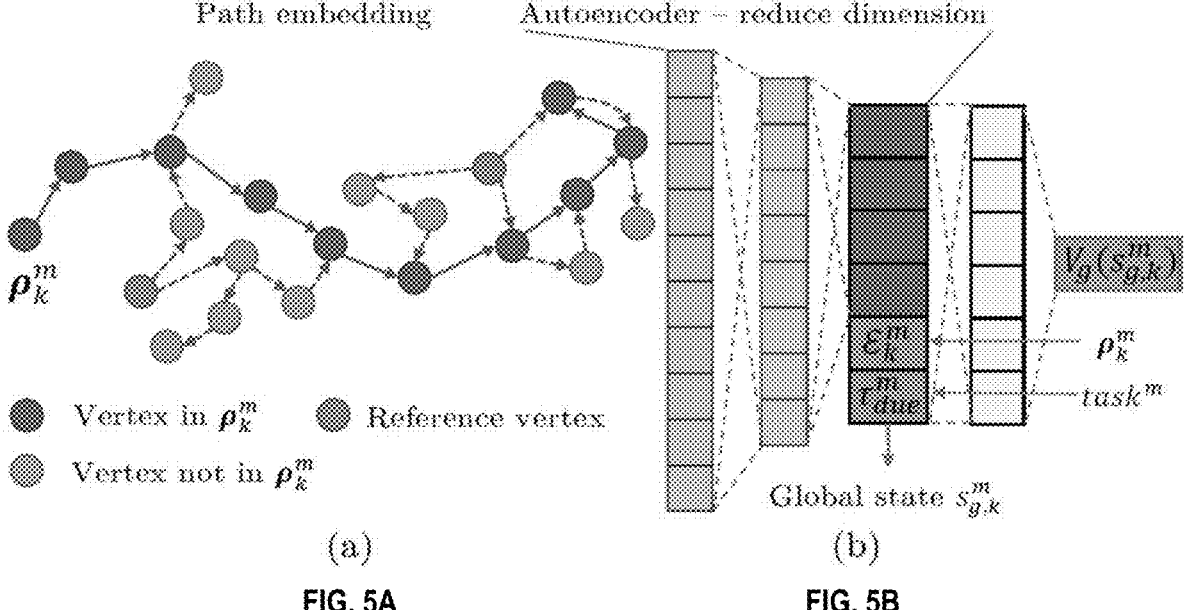
FIG. 5A shows an example path embedding in accordance with certain implementations described herein.
FIG. 5B shows an example autoencoder taking an embedded path in accordance with certain implementations described herein.

These three elements are then normalized to probabilities of returning to a previously visited vertex, visiting a local vertex (breadth-first search), and visiting a deeper vertex (depth-first search), respectively. The embedding outputs a vector where each element is the number of vertices that random walks from the corresponding reference vertex in $N_{ref}$ share with $$\rho_k^m,$$

which is detailed in Algorithm 1. The function node2vecWalk is adopted from [28]. Thus, the embedding space shares dimension with $N_{ref}$ and there are $N_{ref} \times n_{walks} \times n_{steps}$ possibilities. FIG. 5A visualize 2 reference vertices take 3 random walks with 3 steps that output embedding (2, 5).

Autoencoder is an unsupervised machine learning technique that achieves dimension reduction by learning an efficient encoding and decoding scheme that allows it to reconstruct the input data from the reduced representation. FIG. 5A shows an example path embedding ($N_{ref}$, $n_{walks}$, $n_{steps}$=(2,3,3). FIG. 5A shows an example autoencoder taking an embedded path with $N_{ref}$=10, as well as the six-element global state vector. As visualized in FIG. 5B, the encoder part is implemented to reduce the dimension of path embedding from $N_{ref}$ to four.

The time complexity of our proposed path embedding is scalable based on several factors: the number of reference vertices $N_{ref}$, the count of random walks $n_{walks}$, and the step quantity $n_{steps}$. In our implementation, the autoencoder undergoes offline training using randomly generated and embedded paths, and thus, the time spent on this training has been excluded from the time complexity calculations.

In contrast to the centralized critic methods commonly found in the literature, the global reward in our approach is agent-specific. Due to the inherent decentralization, it becomes challenging to predict the precise time slot for task completion across all robots. As a result, the global reward is allocated in each time slot. As defined in (8), robot-k receives a larger reward of 10 when either a pickup or delivery is accomplished within the due time. In contrast, an overdue task receives a diminished reward of 5. Until either the pickup or delivery task is completed, robot-k registers a global reward of 0.

$$r_{g,k}^t = \begin{cases} 10 & \text{picked up or delivered and } \tau_k^m \le \tau_{due}^m \\ 5 & \text{picked up or delivered and } \tau_k^m > \tau_{due}^m \\ 0 & \text{otherwise} \end{cases} \quad (8)$$

Collaborative Training of Shared Global Critic: The edge computing, which hosts the global critic, is not a cyber-physical agent and thus lacks the capability for task execution. As a result, transitions for training the global critic are collaboratively collected by all robots. Considering the execution of task$^m$ as an episode, each robot compiles two global critic transitions—one from the pickup path and the other from the delivery path. By the episode's completion, two paths $$\rho_k^m$$

and two cumulative returns $$R_k^m$$

(as delineated by (9a)) are collected, thus constituting two global state vectors and their corresponding global rewards. It's important to note that, being a state-value function, the global critic doesn't necessitate actions within its transitions. For the global critic, we utilize a neural network as the function approximator, characterized by its weights $$\theta_g^t.$$

Figure 6:
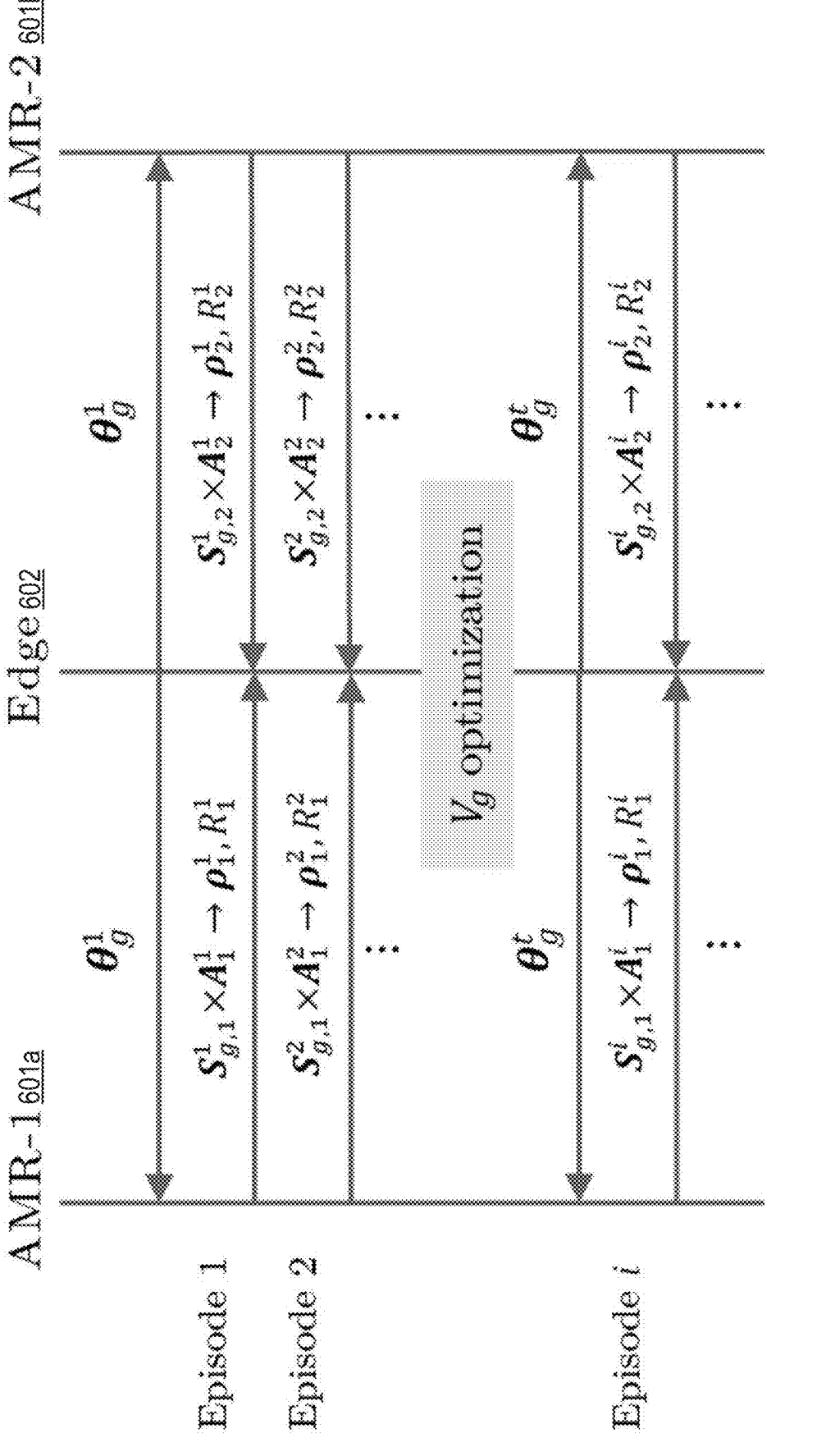
FIG. 6 is a schematic diagram showing an example of decentralized sample collection with two robots in accordance with certain implementations described herein.

FIG. 6 is a schematic diagram showing an example of decentralized sample collection with two robots. As illustrated in FIG. 6, the edge computing system 602, via robot-to-infrastructure (R2I) communications, consistently updates $\theta_{global}$ for all robots (as shown, 601a and 601b). In turn, at the completion of each episode, every robot transmits two transitions to the edge. Consequently, the incorporation of additional robots directly augments the number of transitions available for training the global critic, rendering the training both scalable and efficient. The optimization of the global critic employs gradient ascent, as delineated in (9b), utilizing mean squared loss and experience replay with unified sampling [29]. The trajectory (or path)

$$\rho_k^m$$

outlined in (9a) accounts for the sequential global rewards $$r_{g,k}^t$$

realized at each step.

$$J(V_g) = \mathop{\mathbb{E}}_{\rho_k^m \sim V_g}[R_k^m] = \mathop{\mathbb{E}}_{\rho_k^m \sim V_g}\left[\sum_t^{t+r_k^m} r_{g,k}^t\right] \quad (9a)$$

$$\theta_g^{t+1} = \theta_g^t + lr_g \nabla_\theta J(V_g) \quad (9b)$$

Distributed Local Critics: Each robot individually hosts and trains its local critics, a state-action-value function in a distributed manner. Specifically, the local critic $Q_k$ directs robot-k towards avoiding competitive collisions by predicting the penalty (termed as the local reward) for all possible actions within its action space A. These predictions are based on prior experiences of competitive collisions. The local state $$s_{l,k}^t$$

is constructed as an 8-element vector, directly relating to robot-k's location at time t, represented as $$v_{f_k,x_k,y_k}^t.$$

This local state formulation facilitates better generalization of the correlation between the local state and actions. Formally, $$s_{l,k}^t = (f_k, x_k, y_k, s_{west,k}, s_{south,k}, s_{east,k}, s_{north,k}, s_{cross,k}),$$

in which five binaries $s_{west,k}$, $s_{south,k}$, $s_{east,k}$, $s_{north,k}$, $s_{cross,k}$ indicate either pickup location $$v_{f_p,x_p,y_p}^m$$

or delivery location $$v_{f_d,x_d,y_d}^m$$

locates at left (in y axis), down (in x axis), right (in y axis), up (in x axis) and cross-floor (in floor axis) relative to $$v_{f_k,x_k,y_k}^t$$

respectively. The relative location is not exclusive, for example, $v_{1.3.1}$ locates at both the right side and the down side of $v_{3.2.2}$. Thus, given $G_{floor}$, the local state has the state space of $\Omega_l = N_f \cdot N_x \cdot N_y \cdot 2^4$.

Local rewards, as defined by (10), are determined based on the scenario where $$K_{f_k,x_k,y_k}^t$$

robots are located at $v_{f_k,x_k,y_k}$ at time t. robots that execute an action conflicting with another robot or when the count of robots at a single location exceeds 3 are subjected to a penalty in the form of local rewards.

Notably, when three robots are located at the same location, there's a heightened probability of collision. Under the assumption that robots act randomly, the collision probability is computed as $$1 - \binom{5}{3} \cdot \frac{1}{5}^3 = 0.92.$$

This statistic is particularly appropriate for vertices without cross-floor neighbors.

$$r_{l,k}^t = \begin{cases} -1 & \text{action cause competitive collision as (6),} \\ & \text{or } K_{f_k,x_k,y_k}^t > 3 \\ 0 & \text{otherwise} \end{cases} \quad (10)$$

Therefore, by predicting the local reward using the optimal state-action value function $Q_k$, as elaborated in (11), the actions that avoid competitive collisions will have a larger value. In this context, $\gamma_l$ denotes the discount factor, while $$s_{l,k}' \sim \rho_k^m$$

and a'represent abbreviated forms of the local state and subsequent action in the next time slot, respectively, adhering to the path $$\rho_k^m$$

treated as a trajectory. In our implementation, the target network technique [30] is employed to approximate and refine $$Q_k^*,$$

using the smooth L1 loss and a time-dependent learning rate $$lr_l^t.$$

Again, experience replay with unified sampling is adopted to optimize local critics with fixed-length FIFO replay buffers.

$$Q_k^*(s_{l,k}, a_k) = \mathop{\mathbb{E}}_{s_{l,k}' \sim \rho_k^m}\left[r_{l,k} + \gamma_l \max_{a_k'} Q^*(s_{l,k}', a_k')\right] \quad (11)$$

Two fine-tuning techniques are introduced to address the challenges of distribution shift due to non-stationary tasks. Firstly, for adaptivity, the replay buffers for local critics are reset with the task reconfiguration. Since the transitions in the replay buffer may be outdated and no longer reflect the stochastic characteristics of the current task set after the task reconfigurations. This technique ensures the training is always performed with transitions that reflect the current task set. Secondly, the learning rates $$V_{sub} = \{(f_x, x_i, y_i) \in V_{floor} \mid f_i = f_k \text{ or } f_t = f_i\}, \tag{12a}$$

$$V_{sub1} = V_{sub} \cup \{(f_i, x_i, y_i) \in V_{floor} \mid x_i = 1\}, \tag{12b}$$

$$E_{sub1} = \{((f_i, x_i, y_i), (f_j, x_j, y_j)) \in E_{floor} \mid (f_i, x_{iu}, y_i), (f_j, x_j, y_j) \in V_{sub1}\} \tag{12c}$$

$$G_{sub1} = (V_{sub1}, E_{sub1}) \tag{12d}$$

$$V_{sub2} = V_{sub} \cup \{(f_i, x_i, y_i) \in V_{floor} \mid x_i = N_x\}, \tag{12e}$$

$$\dots \tag{12f}$$

$$lr_l^t$$

defined in (11) have exponential decay with discounting factor $\gamma_{decay}$ and are scheduled to reset to their initial value at the time slots of the task reconfiguration. This also explains the smaller local rewards numerical values in (10) than the global rewards numerical values in (8).

Distributed Actors and Predictive Collision Avoidance with Domain Model

Figure 7:
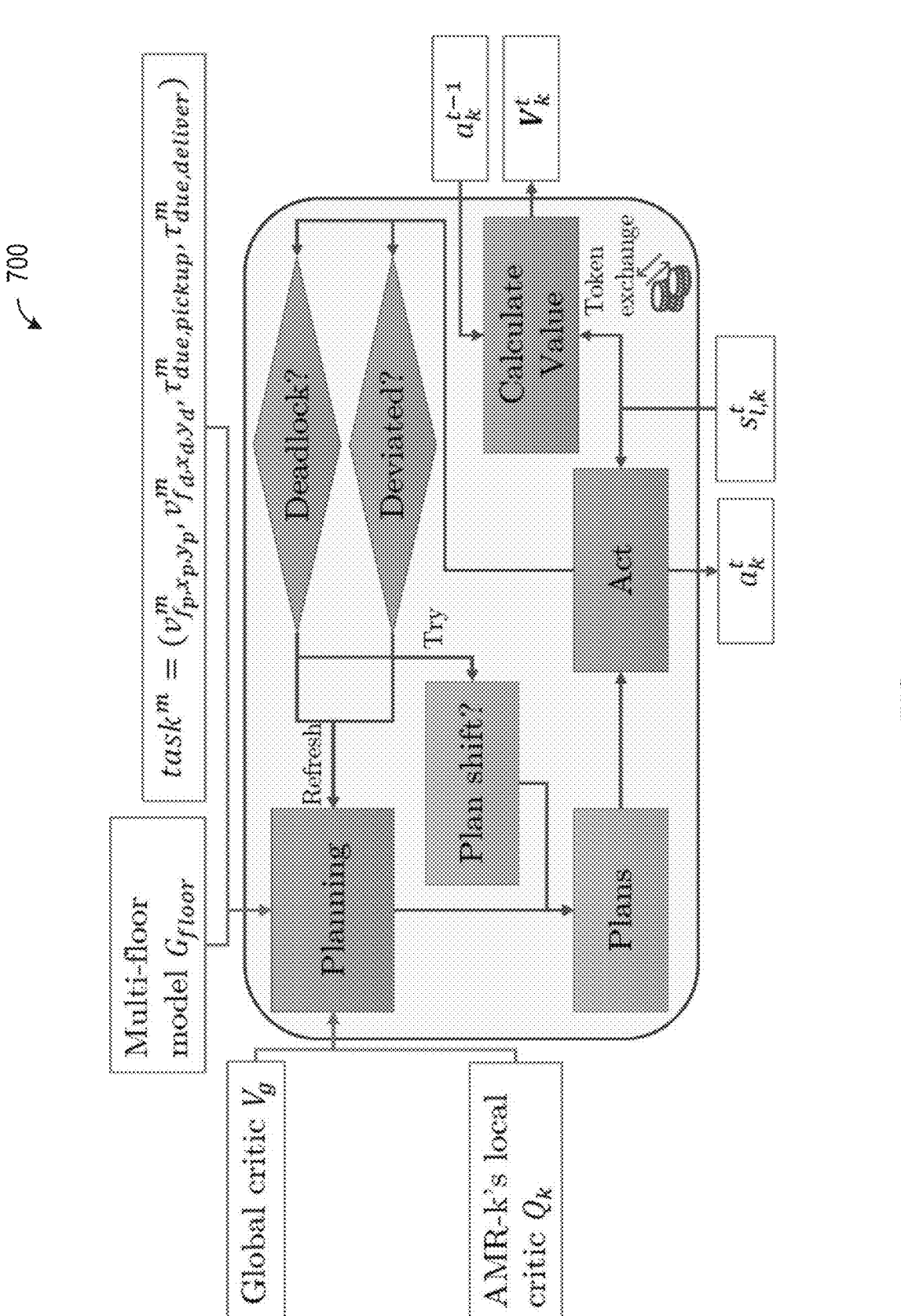
FIG. 7 is a schematic diagram showing an actor algorithm on robots in accordance with certain implementations described herein.

Actor modules are distributed across robots, enabling real-time local navigation decisions. This decentralization serves to mitigate the limitations associated with wireless latency and potential errors inherent in centralized approaches. FIG. 7 is a schematic diagram 700 showing an actor algorithm on robots. As illustrated in FIG. 7, the actor modules operate based on the perceived task assignment. They incorporate predictions from the shared global critic $V_g$, the robot's local critic $Q_k$, the shared multi-floor model $G_{floor}$, and the transportation task task$^m$ to ensure decision-making grounded in fundamental reasoning. Notably, the off-policy optimization employed in both the global and local critics allows the actor module to perform planning and prediction for decision-making at any time slot. Algorithm 2 details the three associated algorithms in the actor module illustrated in FIG. 7.

Planning with Domain Model: An actor module is initialized using the domain model $G_{floor}$ and a predetermined plan number, denoted by $\kappa_N$, to enhance computational efficiency. Upon assignment of task$^m$ to robot-k, it employs a multi-path planning method, which is an enhancement of Yen's algorithm as presented by [32]. This method is outlined as Planning in Algorithm 2. The heuristic term "unfold" is graphically demonstrated in FIG. 3B. This heuristic is instrumental in generating four acyclic sub-graphs from the cyclic graph $G_{floor}$. This transformation is essential because Yen's algorithm is inherently designed for acyclic graphs. To elaborate further, when both the current location of robot, $v_{f_i, x_i, y_i}$, and its target location, $v_{f_t, x_t, y_t}$, (which could either be a pickup vertex with coordinates $f_t = f_s$, $x_t = x_s$, $y_t = y_s$ or a delivery vertex $f_t = f_d$, $x_t = x_d$, $y_t = y_d$) reside on the same floor, the actor algorithm exclusively utilizes the sub-graph of that floor for multi-path planning, as depicted in lines 3-5 of Algorithm 2. Conversely, if the robot's current and target locations are spread across two distinct floors, the actor algorithm incorporates these two floors and vertices that bridge these floors at locations x=1, x=N$_x$, y=1, and y=N$_y$. The algorithm thereby generates four acyclic sub-graphs for multi-path planning, as exhibited by the Unfold method in Algorithm 2 and formally by (12). The planning with domain model adds a greedy heuristic to the actor module since Yen's algorithm gives the shortest plans first, which makes sure robots always execute tasks with optimal or near-optimal path plans.

| | Algorithm 2: Actor module |
|---|---|
| | def planning ($v_{fk \cdot xk \cdot vk}$, $G_{floor}$, task$^x$, $V_g$, $Q_k$, $k_m$, $a_k$): Results plans |
| 1 | $v_{fk \cdot xk \cdot vk} \leftarrow$ task$^x$ |
| 2 | if $f_k == f_c$ ) |
| 3 | $V_{end} = ((f_c, x_k, y_i) \in V_{floor} \mathrm{lft} = f_k)$ |
| 4 | $E_{end} = (((f_k, x_k, y_i), (f_f, x_f, y_i)) = E_{floor} \mathrm{lft} = f_k = f_k)$ |
| 5 | $G_{emb} = (V_{emb}, E_{emb})$ |
| 6 | else: |
| 7 | $(G_{emb}, \dots, G_{emb}) \leftarrow$ unfold $(G_{floor}, f_k, f_k)$ |
| 8 | $(p_k^m, \dots) \leftarrow$ Yen's_algorithm $(((G_{emb}, \dots), v_{fk \cdot xk \cdot vk}, v_{fk \cdot xk \cdot vk}, a_k)$ |
| 9 | values_global $\leftarrow V_k(a_{g,k}^m \leftarrow$ Pathmod$((p_k^m, \dots)))$ |
| 10 | values_local_mean $\leftarrow$ Mean $(Q_k((a_j^k, a_k \dots, ) \leftarrow (p_k^m, \dots)))$ |
| 11 | $A_k((p_k^m, \dots)) \leftarrow a_g \cdot$ values_global + values_local_mean |
| 12 | plans $\leftarrow$ argsort $(a_k, A_k((p_k^m, \dots)))$ def Calculate_value $(a_k^t, a_k^{t-1}, a_{f,k}, Q_k)$: Result: $V_k^t$ |
| 13 | values_local $\leftarrow Q_k(a_{f,k}^t, a)$, $a \in A$ |
| 14 | values_local $\leftarrow$ argsort (values_local) |
| 15 | for a in A: |
| 16 | if a == reverse $(a_k^{t-1})$ |
| 17 | values_local(a) = 0 |
| 18 | elif a == $a_k^t$ : |
| 19 | values_local(a) = 0 |
| 20 | elif a meet cross)floor_condition |
| 21 | values_local(a) = 0 |
| 22 | $V_k^t \leftarrow$ msp (values_local, [0, 1, 2, 3, 4, 5, 6]) def Act (plan, $v_{fk \cdot xk \cdot vk}$, $G_{floor}$, task$^x$, $V_g$, $Q_k$, $k_m$, $a_k$): Result: $a_k^t$ |
| 23 | if plan[ −10 ], count(plan[−1]) > 2: |
| 24 | if plan[ −10 ], count(plan[−2]) > 2: |
| 25 | switch_flag $\leftarrow$ switch_plan $(v_{fk \cdot xk \cdot vk})$ |
| 26 | if -switch_flag; |
| 27 | if Random > 0.5t |
| 28 | return $a_k^t$ = 4 |
| 29 | if $v_{fk \cdot xk \cdot vk} \neq$ plan; |
| 30 | switch_flag $\leftarrow$ switch_plan $(v_{fk \cdot xk \cdot vk})$ |
| 31 | if switch_flag; |
| 32 | Planning $(v_{fk \cdot xk \cdot vk}, G_{floor}, $ task$^x$, $V_g$, $Q_k$, $k_m$, $a_k$) |
| 33 | plan $\leftarrow$ Get_plan $(v_{fk \cdot xk \cdot vk})$ |
| 34 | $a_k^t \leftarrow$ plan |

Predictive Collision Avoidance: Next, the actor module selects $\kappa_k$ plans from a total of $\kappa_N$ plans. The selection is based on the highest advantage values as computed by $A_k$, as defined in (13). This function is introduced after considering both the global and local critic evaluations of robot-k. The generalized advantage function, as presented by [33], offers a relative measurement of the actions within the action space.

In contrast, (13) provides a more nuanced representation. It encapsulates the collective objective's measurement (7a) concerning the relative influence of the plans on aspects such as timely execution, delay mitigation, energy efficiency, and collision avoidance.

Drawing inspiration from TD (2) [34], for a given path plan $$\rho_k^m,$$

the formulation of (13) incorporates $V_g$, which predicts the additive expected return of global rewards from $$\rho_k^m,$$

as detailed herein. Simultaneously, it also integrates $Q_k$, which predicts the expected values of all actions constituting $$\rho_k^m,$$

as detailed herein. Nevertheless, due to the variable number of actions included within each $$\rho_k^m,$$

there exists an inherent bias. To mitigate this, the expected local reward values predicted by $Q_k$ are averaged over the number of actions, denoted as i. In light of this, it becomes crucial to decide on an optimal coefficient, denoted as $\alpha g$, that harmonizes the global critic value with the local critic value.

This coefficient should be determined empirically, considering both the global and local reward functions.

$$A_k(\rho_k^m) = \alpha_g V_g\big(s_{g,k}^m \leftarrow PathEmbd(\rho_k^m)\big) + \frac{1}{i} \sum_{s_l^k, \alpha_k \in \rho_k^m} Q_k\big(s_l^k, \alpha_k \leftarrow \rho_k^m\big) \qquad (13)$$

Consequently, the actor finalizes its decision with the plan possessing the maximum advantage value, designating it as the primary policy. The remaining $\kappa_k-1$ plans serve as alternative plans. This procedure is succinctly outlined in lines 9-12 of Algorithm 2. The formulation in (13) stands as our proposition for collaborative, predictive collision avoidance. This is primarily because all intelligent robots contribute to the training of shared global critic and the planning with domain model is predictive. However, the inherent bias in (13) is beyond the scope of this paper. Our focus isn't to propose it as a universal advantage function, but rather seeking near-optimal performance of the smart factory transportation problem.

Deviations and Deadlocks: As briefed above, due to the path constraint, competitive collisions can happen when robots perform distributed planning. The distributed collision resolution can lead to deviation from path plans and even deadlocks [14]. Two mechanisms are involved in the actor module described by lines 23-32 in Algorithm 2 to address these issues. First, plan switching is performed when deviation or deadlocks are detected. The actor looks for the current location $v_{f_k,x_k,y_k}$ in $\kappa_k-1$ alternative plans and switches to the plan that includes $v_{f_k,x_k,y_k}$ ensured by function Switch_plan. Re-planning is the second mechanism that re-executes multi-floor planning in case no policy contains $v_{f_k,x_k,y_k}$.

The actor has 50 percent to take "stay" action and another 50 percent for re-planning to avoid frequent re-planning in which the probability can be empirically adjusted toward better performance.

Collision Resolution with Token-Passing

Under the proposed collaborative multi-intelligent robot system approach, token-passing-based collision resolution is introduced when competitive collisions are not avoided predictively. This resolution approach ingeniously addresses the balancing between collaboration and competition (competitive collision) via automated intelligent agents' communications. Under the transportation-MRS proposed herein, although the task execution is asynchronous, the discrete navigation steps are synchronous among robots. When competitive collisions happen, the colliding robots resolve the collision in a distributed manner to ensure collision-free paths in task executions.

The token-passing-based collision resolution is inspired by the Dutch auction. In this setup, each robot maintains a locally-stored numerical value termed as $$\mathrm{token}_k^t,$$

which effectively functions as a "currency" facilitating the action-claiming process. Every robot starts with an initial allocation of tokens, represented by the positive integer $$\mathrm{token}_k^0.$$

Figure 8:
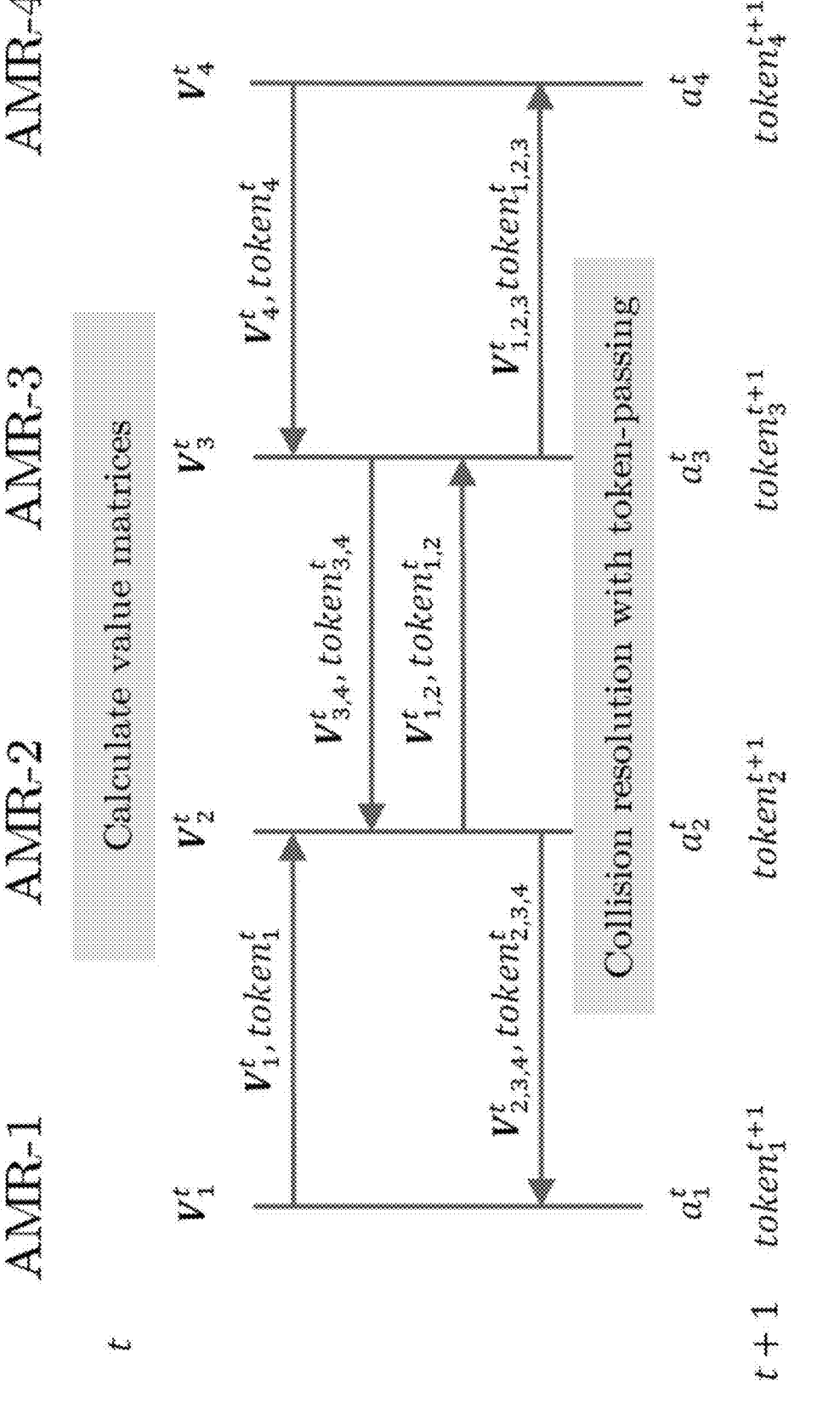
FIG. 8 depicts an example of distributed collision resolution among three robots.

Referring to FIG. 8, consider a scenario where a competitive collision is anticipated among a set of robots, exemplified by robot-1, 2, 3, 4, at a given time t. First, each robot leverages its actor module to compute a value vector $$V_k^t,$$

corresponding to the action space. The computation of this vector is elaborated upon in Algorithm 2 under the function Calculate Value (spanning lines 13 through 22). It ensures actions that avoid competitive collisions are assigned larger values with lines 15 to 21 incorporating domain-specific knowledge. A planned action, as outlined in lines 18 and 19, is assigned a value of 6. In contrast, unplanned cross-floor actions, identified by the cross-floor condition, alongside the action that reverses the last action, are assigned a value of 0. The Map function makes sure all the integer elements in $$V_k^t$$

are in the range of [0, 6], coherent with the action space A.

Next, robots exchange the value vector and token numbers, as depicted in FIG. 7. This communication results in a consolidated value vector, denoted as $$V_{k,a}^t,$$

and token vector token$^t$ for the distributed execution of Algorithm 3. Lines 2 and 4 emphasize that robots holding a larger quantity of tokens are given priority, allowing them to stake a claim on their most valued actions before others. In contrast, robots with fewer tokens find themselves relegated to choosing from the remaining options in Action set. In situations where tokens are sparse, as depicted in lines 7 to 13, some robots may be unable to claim any action. Line 5 underscores that robots will only opt for actions assigned a value exceeding 0, interpreting actions with a value of 0 as being "undesirable". robots unable to claim an action are defaulted to the "stay" action, which doesn't cost any token, as detailed in lines 14 to 16. Lastly, the procedure Token_exchange ensures that the tokens spent by each robot are equally reallocated to other robots. Thus the total number of tokens in the system remains constant, posing a multi-player zero-sum game. Upon resolution, all robots engage in an exchange of the derived outcomes, represented by X$^t$, and their updated token counts, denoted as token$^t$. The resolution of collisions is executed in a distributed manner among the set of colliding robots. This is facilitated by a proximity-based ad hoc wireless network [35], which enhances scalability and optimizes both communication efficiency and energy consumption. In situations where multiple robots demonstrate a preference for the same actions and have equal token counts, a synchronized random seed is employed. This synchronization ensures that the outcomes, represented by X$^t$, remain consistent across the robots. The process of collision resolution not only contributes to the local reward, as detailed herein, but also makes necessary modifications to the initial actions proposed by the actor-mixed-critics algorithm. This ensures adherence to the path constraints. Furthermore, this resolution introduces a degree of variability into the critic transitions, promoting their continuity and smoothness.

---

Algorithm 3: Collision resolution with token-passing

---

Data: A, $a_r{}^t = (a_k{}^t, \ldots)$, $V_{k,s}{}^t$, token$^t$ = (token$_k{}^t$, $\ldots$)
1  $X^k$, prices $\leftarrow \emptyset$
2  robot_set $\leftarrow$ argsort (token)
3  Action sat $\leftarrow$ A
4  for k in robot_set:
5    desired_actions_k $\leftarrow$ argsort ($V_{k,o}{}^t$)
6    for $a_k$ in desired_actions_k:
7      if $a_k$ in Action_set;
8        $X^t \leftarrow$ k, $a_k$
9        price $\leftarrow V^t{}_{k,a}$
10       if price $\geq$ token$_k$:
11         Action_set.remove($a_k$)
12         prices $\leftarrow$ price
13         break
14     if k not in $X^t$:
15       $X^t \leftarrow$ k, $a_k = 4$
16       price $\leftarrow 0$
17   token$^{t+1} \leftarrow$ Token_exchange ($X^{n,t}$, prices, token)

---

Experimental Results

To demonstrate the effectiveness, near-optimal performance, and scalability of the proposed approach, computational experiments are conducted on a set of robot numbers and a set of multi-floor models, where $K \in \{13, 17, 19, 23, 29, 31\}$ and $(N_f, N_y, N_y) \in \{(2, 4, 5), (2, 5, 5), (2, 5, 6), (3, 3, 4), (3, 4, 4), (3, 4, 5)\}$.

Effectiveness. The experiments with 31 robots and multi-floor model with (3, 3, 4) (36 vertices) are conducted for 10,000 timesteps to demonstrate the effectiveness and near-optimal performance. This is because it has the most number of robots and the least number of vertices over all experiments, which naturally cause the most competitive collisions under the path constraint. During 10,000 timesteps, the task set reconfigures at timesteps of 2000, 4000, 6000, and 12000 simulating the non-stationary tasks in smart factories, which is unknown to all robots. To make the results comparable over different task sets, we control the task set with tasks that have an optimal delivery path delay of 6 so that all task sets are equivalently challenging for robots. Each experiment is repeated five times with distinct seed sets for the environment and each robot. Using the parameters in Table I, the results display the curves averaged by the number of robots and five repetitions and their range for five repetitions with shades.

TABLE I

| Parameter values of experiments | | | |
|---|---|---|---|
| Parameter | Value | Parameter | Value |
| $N_f$, $N_x$, $N_y$, K | 3, 3, 4, 31, 7 | $p_{walks}$, $q_{walks}$ | 1, 1 |
| $\epsilon_f$, $\epsilon_x$, $\epsilon_y$ | 3, 1, 2 | $\kappa_k$ | 5 |
| $\beta$ | 0.2 | $\epsilon$ | 1 |
| $\alpha$ | 0.7 | token$_k{}^0$ | 10 |
| $\kappa_N$ | 240 | Training period | 10 time slots |
| $lr_g$, $lr_f{}^k$ | 0.001, 0.0005 | $V_g$ hidden size | [6, 6] |
| $\gamma_l$, $\gamma_{decay}$ | 0.98, 0.90 | $Q_k$ hidden size | [8] |
| $\alpha_{global}$ | 0.1 | $V_g$ buffer size | 5000 |
| $n_{walks}$, $n_{steps}$ | 3, 3 | $Q_k$ buffer size | 1000 |

The results of an experiment with 31 robots in a multi-floor model defined by (3, 3, 4) are shown in FIG. 9A-FIG. 9H and FIGS. 11A-B. While FIG. 9A, FIG. 9B, FIG. 9C, and FIG. 9D, FIG. 9E and FIG. 9F have x-axis of episodes (completed tasks), FIG. 11B, FIG. 9G, FIG. 9H and FIG. 11A have x-axis of timesteps (time slots). The reason is that the delay, energy consumption, and collective objective are defined after completed tasks and both global rewards and local rewards are defined to optimize those performances. The vertical dash lines show the time slots of task reconfigurations (task set changes). Since the number of time slots (timesteps) in each episode is varied, for those with x-axis of episodes, the time slots of task reconfigurations are approximated.

Figures 9A, 9B, 9C, 9D, 9E, 9F, 9G, 9H:
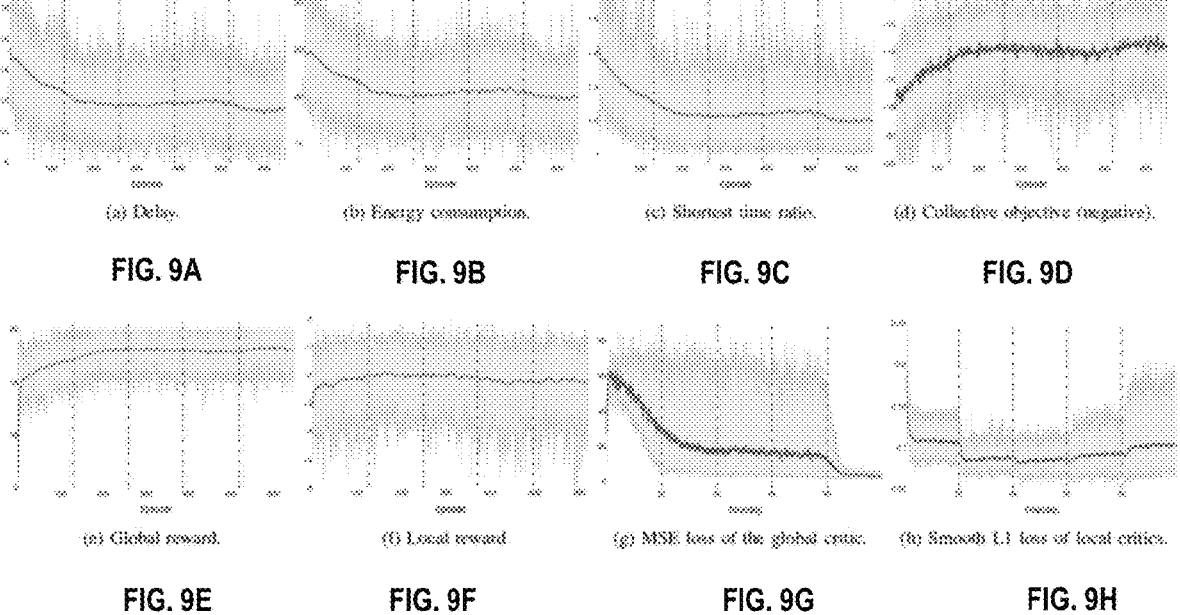
FIG. 9A, FIG. 9B, FIG. 9C, FIG. 9D, FIG. 9E, FIG. 9F, FIG. 9G, and FIG. 9H are graphs depicting experimental performance and training results with a 31-robot system in a multi-floor model.

The shortest time ratio (STR) defined by (14) demonstrates the near-optimality performance, whose result is shown in FIG. 9C. STR calculates the average ratio of delay of each completed task $$(\tau_k^m)$$

over the shortest possible delay $$(\tau_{shortest}^m),$$

in which $\tau m$ shortest has a similar definition of $$\tau_{due}^m$$

in (3) but with margin parameter $\beta=0$. Also, similar to (3), $v_{f_k,x_k,y_k}$ is the location of robot-k as task$^m$ is assigned to it. When STR is closer to 1, more tasks are completed with optimal paths and vice versa.

29

$$STR^T = \frac{1}{K\sum_{t=1}^{T} M^t} \sum_{t=1}^{T} \frac{\tau_k^m}{\tau_{shortest}^m} \qquad (14a)$$

$$\exists \; \tau_k^m \leftarrow \left(task^m, \rho_{k,pickup}^m, \rho_{k,deliver}^m\right) \qquad (14b)$$

$$\tau_{shortest}^m = h_A * \left(v_{f_k,x_k,y_k}, v_{f_p,x_p,y_p}^m\right) + h_A * \left(v_{f_p,x_p,y_p}, v_{f_d,x_d,y_d}^m\right) \qquad (14c)$$

$$m = 1, 2, \ldots, M^T \qquad (14d)$$

Although planning with the domain model ensures near-optimality, robots adaptively avoid competitive collisions to coordinate task execution paths. In the first 200 episodes, as shown in FIG. 9A, FIG. 9B, FIG. 9C and FIG. 9D, delay, energy consumption, and STR decrease significantly. Meanwhile, the collective objective shows significant improvement. In the episodes that follow episode 200, all four performances fluctuate by a little margin even though the task sets change subtly. This suggests that within the first 200 episodes, all robots learned to choose collision-avoidant plans and adapted to the task reconfigurations to maintain performance. As for near-optimality, after 200 episodes, the STR remains around 1.23 on average, which means the average delay is 23 percent larger than the ideal optimal delay. This is achieved by 31 robots operating in a $G_{floor}$ with 36 vertices (3×3×4) so that on average one robot has probability of 0.86 of sharing location with another robot.

FIG. 9E illustrates the average global rewards, which is consistent with the collective objective in FIG. 9D. Because the global critic and global reward are introduced to optimize delay and energy consumption in task execution. FIG. 9H depicts the average local reward that reflects the average number of competitive collisions encountered by a robot every episode. In the first 20 episodes, there is a significant improvement from approximately −3 to −2, and the subsequent episodes continue around −2. Again, this demonstrates that when 31 robots operate on a $G_{floor}$ with 36 vertices, two competitive collisions are expected per episode.

FIG. 9G and FIG. 9H depict the MSE loss of the global critic and the average smooth L1 loss of local critics, respectively. After approximately 9000 time slots, the global critic loss continues to decline and is close to 3. Even the global rewards have a rather greater range ([0, 10]), and the model is trained on all 31 robot transitions, resulting in a good convergence signature. Nonetheless, the average local critic loss indicated that reconfigurations make robot path plan coordination challenging. After a dramatic reduction from 0.25 to 0.11 in the first 400 time slots, each reconfiguration (shown by vertical dot lines) causes shocks to the average local critic curve. This is because reconfiguration disrupts the coordination gained by robots and introduces a distribution shift, requiring them to achieve new coordination collaboratively and adaptively. For local critics, reconfiguration results in optimal weight shifts. Thus quick increases or decreases in loss are observed, which is then optimized by the replay buffer reset fine-tuning mechanism.

Scalability

Figure 10:
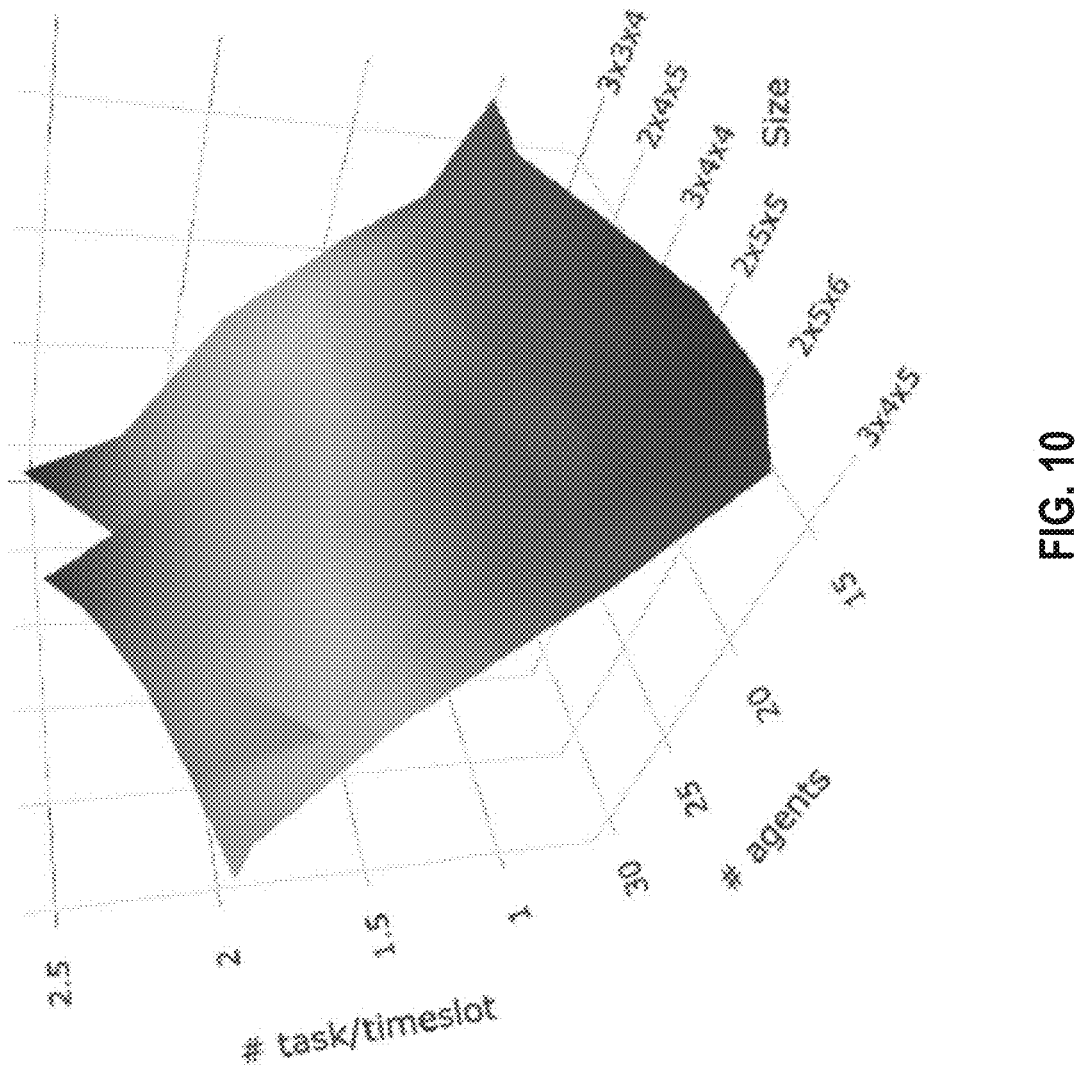
FIG. 10 is a graph demonstrating empirical scalability by completed tasks per time slot.

The scalability of the proposed algorithm is empirically demonstrated by the aforementioned six K values and six multi-floor model definitions, which produce 36 parameter combinations and are depicted by FIG. 10. Since the adaptivity and near-optimality are demonstrated by 31 robots, each parameter combination is trained for 2000 time slots without reconfigurations to demonstrate scalability.

The x-axis in FIG. 10 is ordered by the total number of vertices. The z-axis shows the number of completed tasks per time slot (CTPT), given by (15). It indicates that increasing the number of robots steadily increases transportation task completion even if the shop floor may be more "crowded" and more probable competitive collisions. Additionally, enlarging the multi-floor model by vertex number may lead to longer delays in task execution. Although the optimal delivery delay is fixed at 6, the pickup delay increases with the enlargement. Meanwhile, it leads to less probable competitive collisions. Thus, a small task completion decrease is observed with enlarging the multi-floor model by vertex number.

$$CTPT^T = \frac{K^2 \sum_{t=1}^{T} M^t}{\sum_{t=1}^{T} \sum_{k=1}^{K} \sum_{m=1}^{M^t} \tau_k^m} \qquad (15)$$

DISCUSSION

Scalability and Time Complexity: The proposed approach demonstrates robust scalability with respect to the number of robots. Several key characteristics contribute to this scalability: The decentralization allows the training and predicting of local critics and actors to be independent of the number of robots. For both kinds of critics, the prediction and training are quadratic to the number of neurons in the hidden layers and adjustable through the experience replay technique. The path embedding is linear to the number of reference vertices $N_{ref}$, number of walks $n_{walks}$, and number of steps in each walk $n_{steps}$. The training of the autoencoder is offline and the encoding has quadratic time complexity to the number of reference vertices $N_{ref}$. The k-shortest path algorithm employed in the actors has a time complexity of $O(\kappa_N |V_{floor}|(|E_{floor}|+|V_{floor}| \log |V_{floor}|))$, which can be adjusted by $\kappa N$. The token-passing-based collision resolution is also independent of the number of robots. Consequently, all the components present in the proposed approach are designed to be independent of the total number of robots, K. Furthermore, for algorithms that may exhibit more-than-linear complexity, there exists the flexibility to adjust their computational demands based on specific implementation requirements.

Although the k-shortest path algorithm does not have linear time complexity with expanding the multi-floor model, from the results of size (2, 4, 5), the benefit of enlarging the multi-floor model in the floor axis is empirically demonstrated as (3, 4, 4) and (3, 4, 4) both have larger CTPT value. To determine the layout and scale of the robots in a smart factory, it is more efficient to add new floors than to increase the number of production robots on each floor, given the delay that can be tolerated for the production flows. Thanks to the proposed approach, introducing more robots to fulfill better efficiency also becomes an option under the path constraint.

Collaboration: The proposed approach achieves collision-avoidant paths in a predictive manner under time-varying transportation tasks. To demonstrate this, taking local critics as distributions over A given six $$s_{l,k}^t \in \Omega_l,$$

the variance of KL divergence $$Var_{KLDiv}^t$$

is calculated by (16).

$$D_{KL}(Q_i^t \| Q_j^t)$$

is the KL divergence of local critics of robot-i and robot-j at time slot t. Greater values of $$\text{Var}^t_{KLDiv}$$

suggest that, given the same local state, local critics of all 31 robots tend to take different actions and vice versa. Since local critics are encouraging robots to avoid competitive collisions (take different actions), FIG. 11A displays a significant increase in the first 400 time slots. However, reconfigurations break the coordination, and robots need to balance between acting "too different" and "similar". Similar to the fluctuated average local critic loss, each reconfiguration causes a sudden increase or decrease in $$\text{Var}^t_{KLDiv}.$$

$$\text{Var}^t_{KLDiv} = \text{Var}\big(D_{KL}(Q^i_1 \| Q^t_1), \ldots, D_{KL}(Q^i_1 \| Q^t_K), \ldots, D_{KL}(Q^i_K \| Q^t_K)\big) \quad (16)$$

Furthermore, the implemented token-passing-based collision resolution treats competitive collision as multi-player zero-sum games [36] since FIG. 11B shows the average token number remains the same all the time, which means one robot's pay is other robots' gain. The modeling and utility optimization are out of the scope of this paper since the proposed approach is not game theoretic.

Answer to the Challenges: The results confirm that intelligent robot systems execute adaptive, collision-avoidant, near-optimal paths, optimizing both delay and energy usage in a collaborative and predictive manner. The collective objective definition, supported by FIG. 9A, FIG. 9B, FIG. 9C and FIG. 9D, addresses the first challenge identified above, demonstrating optimized outcomes and the near-optimality of delay. The second challenge is tackled by the decentralized actor-mixed-critics approach leveraging robots' mobile computing. The third challenge is met through collaborative collision resolution emphasizing the communication among robots. The robots are capable of autonomous perception, reasoning, planning and decision-making facilitated by the graphical domain knowledge model-"multi-floor transportation model" to avoid collisions and communicate to resolve collisions. Consequently, the numerical analyses and discussions affirm the effectiveness and scalability of the proposed approach, positioning it as a solution to smart factory transportation challenges that emphasize adaptability and resource efficiency. While the Markov Decision Process (MDP) is prevalently employed in the literature for multi-agent sequential decision-making, its application in modeling smart factory transportation remains open. The dynamism of reconfiguration time slots, $t_1$, $t_2$, . . . and the fluctuating nature of the transportation tasks, $M^t$, are challenging to predict upon executive decisions and varying customer demands. Such dynamics either violate the Markov property, as highlighted in [37], or result in a high-dimensional MDP, challenging the mobile computing capacities of robots, as discussed in [38]. Comparisons with general MDP-model methods including QMIX [39] and MADDPG [40] are conducted and observed struggle with our multi-floor model. Potential adaptations for these methods remain unexplored and earmarked for future research.

CONCLUSION

This research introduces a novel smart factory transportation problem including non-stationary transportation tasks, a multi-floor transportation model and decentralized intelligent robot operation. The problem is formulated as transportation-MRS discrete navigations and robots are modeled as a cyber-physical AI agent system. To address the challenges of smart factory transportation, utilizing automated AI cognitions including reasoning, predicting, planning and decision-making, as well as mobile computing, and wireless communications, a multi-agent actor-mixed-critics algorithm and a wireless-enabled, token-passing-based collision resolution are proposed. This approach takes a multi-floor model as a stepping-stone to AI planning to ensure near-optimality with a short learning curve. The algorithmic design considers time complexity and scalability, which is essential for MRS-driven smart factories. Experiments demonstrate the adaptability to non-stationary transportation tasks and collaborative, predictive path coordination among robots, both of which contribute to the system's performance. Empirical scalability demonstrates that, although adding more robots to the system increases the competition, the MRS can still autonomously, and adaptively optimize the system performance.

Configuration of Certain Implementations

The construction and arrangement of the systems and methods as shown in the various implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to." and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods.

Thus, if there are a variety of additional steps that can be performed it is understood that each of these additional steps can be performed with any specific implementation or combination of implementations of the disclosed methods.

The following patents, applications and publications as listed below and throughout this document are hereby incorporated by reference in their entirety herein.

[1] K. C. Chen, S. C. Lin, J. H. Hsiao, C. H. Liu, A. F. Molisch, and G. P. Fettweis, "Wireless networked multi-robot systems in smart factories," Proceedings of the IEEE, vol. 109, no. 4, pp. 468-494, 2021.

[2] Y. Chen, F. Zhao, and Y. Lou, "Interactive model predictive control for robot navigation in dense crowds," IEEE Transactions on Systems, Man, and Cybernetics: Systems, vol. 52, no. 4, pp. 2289-2301, 2022.

[3] Y. Liu, B. Zhou, X. Wang, L. Li, S. Cheng, Z. Chen, G. Li, and L. Zhang, "Dynamic lane-changing trajectory planning for autonomous vehicles based on discrete global trajectory," IEEE Transactions on Intelligent Transportation Systems, vol. 23, no. 7, pp. 8513-8527, 2022.

[4] Z. Nie and K.-C. Chen, "Hypergraphical real-time multirobot task allocation in a smart factory," IEEE Transactions on Industrial Informatics, vol. 18, no. 9, pp. 6047-6056, 2022.

[5] S. K. Jagatheesaperumal, M. Rahouti, K. Ahmad, A. Al-Fuqaha, and M. Guizani, "The duo of artificial intelligence and big data for industry 4.0: Applications, techniques, challenges, and future research directions," IEEE Internet of Things Journal, vol. 9, no. 15, pp. 12 861-12 885, 2022.

[6] A. Balachandran, A. Lal S, and P. Sreedharan, "Autonomous navigation of an amr using deep reinforcement learning in a warehouse environment," in 2022 IEEE 2nd Mysore Sub Section International Conference (MysuruCon). IEEE, 2022, pp. 1-5.

[7] S. S. Abosuliman and A. O. Almagrabi, "Routing and scheduling of intelligent autonomous vehicles in industrial logistics systems," Soft Computing, vol. 25, pp. 11 975-11 988, 2021.

[8] W. Xia, J. Goh, C. A. Cortes, Y. Lu, and X. Xu, "Decentralized coordination of autonomous agvs for flexible factory automation in the context of industry 4.0," in 2020 IEEE 16th International Conference on Automation Science and Engineering (CASE). IEEE, 2020, pp. 488-493.

[9] Z. Liu, Y. Zhang, C. Yuan, and J. Luo, "Adaptive path following control of unmanned surface vehicles considering environmental disturbances and system constraints," IEEE Transactions on Systems, Man, and Cybernetics: Systems, vol. 51, no. 1, pp. 339-353, 2021.

[10] J. Zhao, W. Li, C. Hu, G. Guo, Z. Xie, and P. K. Wong, "Robust gain-scheduling path following control of autonomous vehicles considering stochastic network-induced delay." IEEE Transactions on Intelligent Transportation Systems, vol. 23, no. 12, pp. 23 324-23 333, 2022.

[11] M. Pei, H. An, B. Liu, and C. Wang, "An improved dyna-q algorithm for mobile robot path planning in unknown dynamic environment." IEEE Transactions on Systems, Man, and Cybernetics: Systems, vol. 52, no. 7, pp. 4415-4425, 2022.

[12] K. V. Sagar and J. Jerald, "Real-time automated guided vehicles scheduling with markov decision process and double q-learning algorithm," Materials Today: Proceedings, vol. 64, pp. 279-284, 2022.

[13] Z. Chen, J. Alonso-Mora, X. Bai, D. D. Harabor, and P. J. Stuckey, "Integrated task assignment and path planning for capacitated multi-agent pickup and delivery." IEEE Robotics and Automation Letters, vol. 6, no. 3, pp. 5816-5823, 2021.

[14] T. Yamauchi, Y. Miyashita, and T. Sugawara, "Standby-based deadlock avoidance method for multi-agent pickup and delivery tasks," in Proceedings of the 21st International Conference on Autonomous Agents and Multi-agent Systems, ser. AAMAS '22. Richland, SC: International Foundation for Autonomous Agents and Multi-agent Systems, 2022, p. 1427-1435.

[15] M. Kneissl, A. K. Madhusudhanan, A. Molin, H. Esen, and S. Hirche, "A multi-vehicle control framework with application to automated valet parking." IEEE Transactions on Intelligent Transportation Systems, vol. 22, no. 9, pp. 5697-5707, 2021.

[16] M. Autili, L. Chen, C. Englund, C. Pompilio, and M. Tivoli, "Cooperative intelligent transport systems: Choreography-based urban traffic coordination," IEEE Transactions on Intelligent Transportation Systems, vol. 22, no. 4, pp. 2088-2099, 2021.

[17] I. Ahmed, G. Jeon, and F. Piccialli, "From artificial intelligence to explainable artificial intelligence in industry 4.0: A survey on what, how, and where," IEEE Transactions on Industrial Informatics, vol. 18, no. 8, pp. 5031-5042, 2022.

[18] H. Ghorbel, J. Dreyer, F. Abdalla, V. R. Montequ'in, Z. Balogh, E. Gatial, I. Bundinsk'a, A. Gligor, L. B. Iantovics, and S. Carrino, "Soon: Social network of machines to optimize task scheduling in smart manufacturing," in 2021 IEEE 32nd Annual International Symposium on Personal, Indoor and Mobile Radio Communications (PIMRC). IEEE, 2021, pp. 1-6.

[19] H. Shi, J. Li, M. Liang, M. Hwang, K.-S. Hwang, and Y.-Y. Hsu, "Path planning of randomly scattering waypoints for wafer probing based on deep attention mechanism," IEEE Transactions on Systems, Man, and Cybernetics: Systems, vol. 53, no. 1, pp. 529-541, 2023.

[20] R. Reijnen, Y. Zhang, W. Nuijten, C. Senaras, and M. Goldak Altgassen, "Combining deep reinforcement learning with search heuristics for solving multi-agent path finding in segment-based layouts," in 2020 IEEE Symposium Series on Computational Intelligence (SSCI). IEEE, 2020, pp. 2647-2654.

[21] Z. Liu, B. Chen, H. Zhou, G. Koushik, M. Hebert, and D. Zhao, "Mapper: Multi-agent path planning with evolutionary reinforcement learning in mixed dynamic environments," in 2020 IEEE/RSJ International Conference on Intelligent Robots and Systems (IROS). IEEE, 2020, pp. 11 748-11 754.

[22] X. Liu, H. Zhang, J. Lin, X. Chen, Q. Chen, and N. Mao, "A queuing network model for solving facility layout problem in multifloor flow shop," IEEE Access, vol. 10, pp. 61 326-61 341, 2022.

[23] Z. Nie and K.-C. Chen, "Distributed coordination by social learning in the multi-robot systems of a smart factory," in 2021 IEEE Global Communications Conference (GLOBECOM). IEEE, 2021, pp. 01-06.

[24] M. Rabin, "Inference by believers in the law of small numbers," The Quarterly Journal of Economics, vol. 117, no. 3, pp. 775-816, 2002.

[25] D. Xia, C. Jiang, J. Wan, J. Jin, V. C. Leung, and M. Martinez-Garcia, "Heterogeneous network access and fusion in smart factory: A survey," ACM Computing Surveys, vol. 55, no. 6, pp. 1-31, 2022.

[26] Y. Du, J. Li, C. Li, and P. Duan, "A reinforcement learning approach for flexible job shop scheduling problem with crane transportation and setup times," IEEE Transactions on Neural Networks and Learning Systems, pp. 1-15, 2022.

[27] N. Kumar and J. Kumar, "Efficiency 4.0 for industry 4.0," Human Technology, vol. 15, no. 1, p. 55, 2019.

[28] A. Grover and J. Leskovec, "node2vec: Scalable feature learning for networks," in Proceedings of the 22nd ACM SIGKDD international conference on Knowledge discovery and data mining, 2016, pp. 855-864.

[29] W. Fedus, P. Ramachandran, R. Agarwal, Y. Bengio, H. Larochelle, M. Rowland, and W. Dabney, "Revisiting fundamentals of experience replay," in International Conference on Machine Learning. PMLR, 2020, pp. 3061-3071.

[30] J. Fan, Z. Wang, Y. Xie, and Z. Yang, "A theoretical analysis of deep q-learning," in Learning for Dynamics and Control. PMLR, 2020, pp. 486-489.

[31] N. Agarwal, S. Goel, and C. Zhang, "Acceleration via fractal learning rate schedules," in Proceedings of the 38th International Conference on Machine Learning, ser. Proceedings of Machine Learning Research, M. Meila and T. Zhang, Eds., vol. 139. PMLR, 18-24 Jul. 2021, pp. 87-99. [Online]. Available: proceedings.mlr.press/v139/agarwal21a.html

[32] A. Al Zoobi, D. Coudert, and N. Nisse, "Space and Time Trade-Off for the k Shortest Simple Paths Problem," in SEA 2020-18th International Symposium on Experimental Algorithms, ser. Leibniz International Proceedings in Informatics (LIPIcs), vol. 160, no. 18. Catania, Italy: Schloss Dagstuhl-Leibniz-Zentrum fur Informatik, June 2020, p. 13. [Online]. Available: hal.inria.fr/hal-02865918

[33] J. Schulman, P. Moritz, S. Levine, M. Jordan, and P. Abbeel, "High-dimensional continuous control using generalized advantage estimation," International Conference on Learning Representations (ICLR), 2016.

[34] R. S. Sutton and A. G. Barto, Reinforcement learning: An introduction. MIT press, 2018.

[35] R. Mirsky, I. Carlucho, A. Rahman, E. Fosong, W. Macke, M. Sridharan, P. Stone, and S. V. Albrecht, "A survey of ad hoc teamwork: Definitions, methods, and open problems," in European Conference on Multi-agent Systems, 2022.

[36] L. Zhao and K.-C. Chen, "The game theoretic consensus in a networked multi-agent system," in 2018 IEEE Global Communications Conference (GLOBECOM). IEEE, 2018, pp. 1-7.

[37] W. B. Powell, Reinforcement Learning and Stochastic Optimization: A Unified Framework for Sequential Decisions. John Wiley & Sons, 2022.

[38] B. Yuan, J. Wang, P. Wu, and X. Qing, "Iot malware classification based on lightweight convolutional neural networks," IEEE Internet of Things Journal, vol. 9, no. 5, pp. 3770-3783, 2022.

[39] T. Rashid, M. Samvelyan, C. S. De Witt, G. Farquhar, J. Foerster, and S. Whiteson, "Monotonic value function factorisation for deep multi-agent reinforcement learning," The Journal of Machine Learning Research, vol. 21, no. 1, pp. 7234-7284, 2020.

[40] R. Lowe, Y. I. Wu, A. Tamar, J. Harb, O. Pieter Abbeel, and I. Mordatch, "Multi-agent actor-critic for mixed cooperative-competitive environments," Advances in neural information processing systems, vol. 30, 2017.

What is claimed is:

1. A multi-robot system comprising:

an edge server; and a plurality of robots in electronic communication with one another and the edge server, each robot being config- ured to:

receive at least one transportation task from the edge server;

determine an optimal path for executing the at least one transportation task based at least in part on: (i) one or more transportation task parameters, (ii) a shared global critic function accessible to the plurality of robots, and (iii) a local critic function unique to the respective robot, and execute the at least one transportation task in accor- dance with the determined optimal path, wherein each of the plurality of robots is configured to initiate a token-passing based resolution to resolve potential collisions with one another in real-time.

2. The multi-robot system of claim 1, wherein each of the plurality of robots is configured to execute a plan switch in response to detecting a deviation from a path plan or deadlock with another robot.

3. The multi-robot system of claim 1, wherein the optimal path is determined based at least in part on a multi-floor graph-based model.

4. The multi-robot system of claim 3, wherein each of the plurality of robots is configured to determine the optimal path by applying a random walk-based path embedding algorithm to the multi-floor graph-based model.

5. The multi-robot system of claim 1, wherein the one or more transportation task parameters include at least one of a pickup vertex, a delivery vertex, a target pickup time, a target delivery time, and energy efficiency.

6. The multi-robot system of claim 1, wherein each of the plurality of robots is configured to:

continuously determine global states and global rewards based at least in part on the shared global critic func- tion; and continuously determine local states and local rewards based at least in part on its respective local critic function, wherein the determined global states, global rewards, local states, and local rewards are used to determine or modify the optimal path.

7. The multi-robot system of claim 1, wherein the shared global critic function is configured to facilitate predicting a global reward corresponding to a contribution of a pickup or delivery path.

8. The multi-robot system of claim 1, wherein each of the plurality of robots comprises one or more unsupervised machine learning models or deep learning models.

9. The multi-robot system of claim 8, wherein each of the plurality of robots is configured to host and continuously train the one or more unsupervised machine learning models or deep learning models.

10. The multi-robot system of claim 8, wherein the one or more unsupervised machine learning models or deep learn- ing models are trained using randomly generated and embedded paths.

11. The multi-robot system of claim 1, wherein the shared global critic function comprises a neural network model.

12. The multi-robot system of claim 1, wherein each of the plurality of robots is configured to:

receive a global reward in response to executing a pickup or delivery within a target time frame and receive a diminished global reward in response to failing to execute the pickup or delivery within the target time frame.

13. A method of operating a first robot in a multi-robot system, wherein the first robot and at least one additional robot of the multi-robot system are in electronic communi- cation with one another, the method comprising:

receiving, by the first robot, at least one transportation task;

determining, by the first robot, an optimal path for execut- ing the at least one transportation task based at least in part on: (i) one or more transportation task parameters, (ii) a shared global critic function accessible to the first robot and the at least one additional robot, and (iii) a local critic function unique to the first robot; and executing, by the first robot, the at least one transportation task in accordance with the determined optimal path.

14. The method of claim 13, further comprising:

initiating, by the first robot, a token-passing based reso- lution to resolve potential collisions with the at least one additional robot in real-time.

15. The method of claim 13, further comprising:

in response to detecting a deviation from a path plan or deadlock with another robot, executing, by the first robot, a plan switch.

16. The method of claim 13, wherein the first robot is configured to determine the optimal path by applying a random walk-based path embedding algorithm to a multi- floor graph-based model.

17. The method of claim 13, wherein the first robot is further configured to:

train one or more unsupervised machine learning models or deep learning models using randomly generated and embedded paths.

18. The method of claim 13, wherein the one or more transportation task parameters include at least one of a pickup vertex, a delivery vertex, a target pickup time, a target delivery time, and energy efficiency.

19. The method of claim 13, wherein the first robot is further configured to:

continuously determine global states and global rewards based at least in part on the shared global critic func- tion; and continuously determine local states and local rewards based at least in part on the local critic function, wherein the determined global states, global rewards, local states, and local rewards are used to determine or modify the optimal path.

20. A non-transitory computer-readable medium compris- ing a memory having instructions stored thereon to cause a processor to:

receive at least one transportation task;

determine an optimal path for executing the at least one transportation task via at least one robot based at least in part, on: (i) one or more transportation task param- eters, (ii) a shared global critic function accessible to a plurality of robots, and (iii) a local critic function unique to each of the plurality of robots, and cause execution of the transportation task in accordance with the determined optimal path, wherein at least one robot is configured to initiate a token-passing based resolution to resolve potential collisions with at least another robot in real-time.

* * * * *